(12) United States Patent
Zhang et al.

(10) Patent No.: US 10,903,692 B2
(45) Date of Patent: *Jan. 26, 2021

(54) SYSTEMS AND METHODS FOR LOAD POSITION DETECTION AND POWER CONTROL OF OMNI-DIRECTIONAL WIRELESS POWER TRANSFER

(71) Applicant: THE UNIVERSITY OF HONG KONG, Hong Kong (CN)

(72) Inventors: Cheng Zhang, Hong Kong (CN); Deyan Lin, Hong Kong (CN); Shu Yuen Ron Hui, Hong Kong (CN)

(73) Assignee: The University of Hong Kong, Hong Kong (CN)

( * ) Notice: Subject to any disclaimer, the term of this patent is extended or adjusted under 35 U.S.C. 154(b) by 43 days.

This patent is subject to a terminal disclaimer.

(21) Appl. No.: 16/366,863

(22) Filed: Mar. 27, 2019

(65) Prior Publication Data

US 2019/0222069 A1  Jul. 18, 2019

Related U.S. Application Data

(63) Continuation of application No. 15/546,195, filed as application No. PCT/CN2015/071543 on Jan. 26, 2015, now Pat. No. 10,270,294.

(51) Int. Cl.
| | |
|---|---|
| *H02J 50/12* | (2016.01) |
| *H02J 50/23* | (2016.01) |
| *H02J 50/40* | (2016.01) |

(52) U.S. Cl.
CPC .............. *H02J 50/12* (2016.02); *H02J 50/23* (2016.02); *H02J 50/40* (2016.02)

(58) Field of Classification Search
CPC combination set(s) only.
See application file for complete search history.

(56) References Cited

U.S. PATENT DOCUMENTS

| | | | |
|---|---|---|---|
| 10,270,294 B2* | 4/2019 | Zhang | ................... H02J 50/12 |
| 2014/0347007 A1 | 11/2014 | Kee et al. | |
| 2015/0054344 A1 | 2/2015 | Ng et al. | |

FOREIGN PATENT DOCUMENTS

| | | |
|---|---|---|
| CN | 103094993 A | 5/2013 |
| CN | 203289202 U | 11/2013 |
| KR | 10-2014-0120404 A | 10/2014 |
| WO | WO-2014/119389 A1 | 8/2014 |

OTHER PUBLICATIONS

International Search Report in International Application No. PCT/CN2015/071543, filed Jan. 26, 2015.
(Continued)

*Primary Examiner* — Robert L Deberadinis
(74) *Attorney, Agent, or Firm* — Saliwanchik, Lloyd & Eisenschenk

(57) ABSTRACT

The present invention is directed towards methods and systems for omni-directional wireless power transfer. The method comprises generating magnetic field in all directions, detecting the loads based on the magnetic field shape and focusing the power flow towards the detected loads, so as to maximize the energy efficiency of the wireless power transfer.

16 Claims, 16 Drawing Sheets

(56) References Cited

OTHER PUBLICATIONS

Jonah, O. et al., "Orientation Insensitive Power Transfer by Magnetic Resonance for Mobile Devices", pp. 5-8, 2013 IEEE.
Ng, W.M., et al., "Two- and Three-Dimensional Omnidirectional Wireless Power Transfer", Letters, IEEE Transactions on Power Electronics, Sep. 2014, 29(9):4470-4474, 2014 IEEE.
Wang, D. et al., "Enabling Multi-Angle Wireless Power Transmission via Magnetic Resonant Coupling", pp. 1395-1400.
Semechko, A., "Uniform Sampling of a Sphere", http://www.mathworks.com/matlabcentral/fileexchange/37004-uniform-sampling-of-a-sphere, May 2013, 3 pages, retrieved from Internet Archive Wayback Machine http://web.archive.org/web/20131231235937/http://www.mathworks.com/matlabcentral/fileexchange/37004-uniform-sampling-of-a-sphere on Jun. 26, 2018.
O'Brien, K., "Inductively Coupled Radio Frequency Power Transmission System for Wireless Systems and Devices", Technische Universitat Dresden, Dec. 5, 2005, Shaker Verlag Aachen 2007.

\* cited by examiner

SYSTEMS AND METHODS FOR LOAD POSITION DETECTION AND POWER CONTROL OF OMNI-DIRECTIONAL WIRELESS POWER TRANSFER

CROSS-REFERENCE TO RELATED APPLICATIONS

This application is a continuation of U.S. application Ser. No. 15/546,195, filed Jul. 25, 2017; which is the U.S. national stage application of International Patent Application No. PCT/CN2015/071543, filed Jan. 26, 2015; the disclosures of each of which are incorporated herein by reference in their entirety.

FIELD OF THE INVENTION

The present application generally relates to wireless power transfer. In particular, the present application relates to systems and methods for load position detection and power control of omni-directional wireless power transfer.

BACKGROUND OF THE INVENTION

Wireless power pioneered by Tesla a century ago can be classified as radiative and non-radiative. For non-radiative applications, most of the low-power and medium/high power wireless power applications have their power flow guided by coil-resonators. In many low-power applications such as sensors and RFID devices, replacing the batteries has been a maintenance problem in industry. A well-designed omni-directional wireless charging system is therefore a highly attractive and economic option for charging a multiple of devices simultaneously.

So far, the majority of the non-radiative wireless power systems have the power flow either in one direction (i.e., 1-dimensional power flow) or two directions on the same plane (i.e., 2-dimensional power flow). However, three recent reports published by Wang et al. (see, D. Wang, Y Zhu, Z. Zhu, T. T. Mo and Q. Huang, "Enabling multi-angle wireless power transmission via magnetic resonant coupling", International Conference on Computing and Convergence Technology (ICCCT) 2012, pp: 1395-1400; hereinafter "Wang"), Jonah et al. (see, O. Jonah, S. V. Georgakopoulos and M. M. Tentzeris, "Orientation insensitive power transfer by magnetic resonance for mobile devices", IEEE Wireless Power Transfer, Perugia, Italy, 15-16 May, 2013, pp: 5-8; hereinafter "Jonah") and Kathleen O'Brien (Ph. D Thesis: "Inductively coupled radio frequency power transmission system for wireless systems and devices", Technische Universitat Dresden, 5 Dec. 2005; hereinafter "O'Brien") explore the possibility of omni-directional wireless power. O'Brien describes a transmitter system comprising three orthogonal coils and a receiver system also comprising three orthogonal coils. However, in modern applications such as the receiver coils for mobile phones and radio-frequency identity (RFID) tags, the format factor of the mobile devices requires the receiver coil to be a planar one. So a receiver system with three orthogonal coils is not suitable. Wang utilizes orthogonal coils to reduce the effect of small mutual inductance when the receiver coil is perpendicular to one of the transmitter coils, in which two separate orthogonal coils are driven by a single power source with the same ac current, that is, the two separate coils are connected in series. This is why the receiver coil can pick up maximum power at an angle of 45° between the two orthogonal transmitter coils, where the vectorial sum of the two co-axial magnetic field vectors from the two orthogonal coils is maximum if the two coil currents are identical. Wang also suggests the extension to the 3-D structure based on 3 separate orthogonal coils that are connected in series and fed by the same current. In fact, Wang considers the open ended coils as antennas, and use the parasitic coil inductance and capacitance to form an equivalent LC circuit. However, considering the coils are considered as antennas, such a design approach based on impedance matching or the maximum power transfer theorem would have the following limitations:

1) The length of the wire used to implement the resonant circuit is comparable to the wavelength at the resonance frequency. Both of the transmitter and receiver coils are one quarter of the wavelength at the resonant frequency. This approach is therefore dimension-dependent and is restrictive in terms of the relative sizes of transmitter and receiver coils.

2) Due to the usually low parasitic capacitance in open-ended coil, the resonant frequency and therefore the operating frequency is usually high. High-frequency ac power sources are usually more expensive than low-frequency ac power sources.

Jonah discloses that a 3-coil receiver structure with 3 orthogonal open-ended coils is placed inside a similar but larger 3-coil transmitter structure also with open-ended coils. The 3 orthogonal transmitter coils are connected in series and driven with the same ac current. It was demonstrated that wireless power transfer to the 3-coil receiver unit can be achieved regardless of the orientation of the receiver unit inside the transmitter structure. However, this orientation-insensitive feature is only possible if the receiver has 3 orthogonal coils. For RFID tags applications, it is more likely to have a single planar coil in the RFID tag as a receiver coil. So the approach proposed by Jonah is not suitable for a single-coil receiver.

Furthermore, both Wang and Jonah adopt the impedance matching based on the maximum power transfer (MPT) method, which results that the system energy efficiency will not exceed 50%. The use of the same current in the orthogonal coils (i.e. identical current control) also does not generate a magnetic field vector that points in all directions in a 3-dimensional (3-D) manner—which is an essential feature for true omni-directional wireless power transfer.

W. M. Ng and the inventors of this invention have previously proposed the non-identical current control method that can generate rotating magnetic field in 2-dimensional and 3-dimensional space for omni-directional wireless charging systems; see, U.S. patent application Ser. No. 13/975,409, entitled "Wireless Energy Transfer Systems" and filed on Aug. 26, 2013, which is incorporated herein by reference in its entirety (hereinafter "WMNG1").

WMNG1 provides a non-identical current control method for omni-directional wireless power system using three orthogonal closed loop coils. FIG. 1 shows a typical winding structure of a 3-dimensional (3D) omni-directional transmitter comprising 3 orthogonal coils in the x-, y- and z-plane. In practice, each coil is connected to a series capacitor to form a coil-resonator. Each resonator is driven by an AC power source. For genuine omni-directional wireless power transfer, it is necessary for the orthogonal coil current to be non-identical with each other. The 3 coil currents, $I_1$, $I_2$, $I_3$, can generally be expressed respectively as:

$$I_1 = I_{m1} \sin(\omega t) \quad (1)$$

$$I_2 = I_{m2} \sin(\omega t + \alpha) \quad (2)$$

$$I_3 = I_{m3} \sin(\omega t + \beta) \quad (3);$$

where ω is the angular frequency of the currents, t is the time variable, $I_{mx}$ is the current magnitude of coil-x (for x=1, 2, 3); α and β are two angular displacements. To achieve omni-directional wireless power transmission, rotating magnetic field vectors can be generated by either (i) current amplitude modulation, (ii) phase angle control or (iii) frequency modulation described by WMNG1.

For example, the amplitude modulation approach is illustrated with the following example. Let:

$$I_{m1} = I_m, \; I_{m2} = I_m\sin(\omega_2 t), \; I_{m3} = I_m\sin\left(\omega_2 t + \frac{\pi}{2}\right), \; \alpha = \frac{\pi}{2} \text{ and } \beta = \frac{\pi}{2},$$

where $\omega_2$ is another angular frequency different from ω. Equations (1)-(3) become:

$$I_1 = I_m\sin(\omega t) \tag{4}$$

$$I_2 = [I_m\sin(\omega_2 t)]\sin\left(\omega t + \frac{\pi}{2}\right) \tag{5}$$

$$I_3 = \left[I_m\sin\left(\omega_2 t + \frac{\pi}{2}\right)\right]\sin\left(\omega t + \frac{\pi}{2}\right) \tag{6}$$

Based on this amplitude modulation approach, the trajectory of the magnetic field vector will form a 3-dimensional sphere as shown in FIG. 2, which is a confirmation of the true omni-directional wireless power system. According to the method proposed by WMNG1, a 2-dimensional prototype based on a 2-orthogonal-coil transmitter system has been successfully demonstrated in FIG. 3 by W. M. Ng et al. (see, W. M. Ng, C. Zhang, D. Lin, and S. Y. R. Hui, "Two- and three-dimensional omni-directional wireless power transfer," *IEEE Transactions on Power Electronics Letters*, in press, hereinafter "WMNG2"). WMNG2 has shown that under the identical current method, the energy transfer efficiency is close to zero in some angles as shown in FIG. 4, implying that the identical current control in the 2 orthogonal coils will not generate true omni-directional wireless power in the 2-dimensional plane. But the non-identical current control proposed by WMNG1 and WMNG2 can generate fairly evenly distributed energy efficiency over 360° as shown in FIG. 5, confirming the true omni-directional nature of the wireless power transfer systems in this 2-dimensional prototype.

However, the results of FIG. 4 and FIG. 5 obtained by the inventors (i.e., W. M. Ng et al.) led us to consider a new problem. By comparing the results in FIG. 4 and FIG. 5, it shows that if the magnetic flux direction is controlled in a specific way, it is possible to achieve a high energy efficiency of 73% at certain angular positions as shown in FIG. 4. If we let the magnetic field vector to point in all directions over the spherical surface shown in FIG. 2, the average energy efficiency over all the angles is high, but the maximum energy efficiency is only about 60% as shown in FIG. 5, which is less than 73% as shown in FIG. 4.

Reference to any prior art in the description is not, and should not be taken as an acknowledgement or any form of suggestion that this prior art forms part of the common general knowledge or that this prior art could reasonably be expected to be ascertained, understood and regarded as relevant by a person skilled in the art.

SUMMARY OF THE INVENTION

Therefore, there is a need to develop a new omni-directional wireless power transfer technique, which can (i) generate a magnetic field in all directions in the 2-dimensional or 3-dimensional space, (ii) detect the position of loads and (iii) focus the magnetic flux towards the loads for wireless energy transfer under the high energy efficiency conditions. The present application is directed towards methods and systems for detecting the positions of the receivers/loads and providing directional wireless power transfer to the loads to maximize the energy efficiency of the energy transfer.

In some aspects, the present application is directed to a control method for omni-directional wireless power transfer, which comprises adjusting, for each point of N points, voltage amplitudes for a wireless power transfer transmitter to amplitudes of a reference voltage vector corresponding to the point for a predetermined period of time, and capturing a current amplitude flowing through each coil of the transmitter to form magnetic coordinates corresponding to the point; wherein the N points are preferably uniformly distributed points sampled from a surface of a unit space, the shape of the unit space is the shape of magnetic field generated by coils of the transmitter, and the coordinates values of each sampled point are proportional to the amplitudes of the reference voltage vector corresponding to the point. For three orthogonal transmitter coils sharing the same center, such the surface of the unit space is normally spherical. The method further comprises obtaining, for each point of the N points, a distortion distance between the formed coordinates and reference coordinates corresponding to the point, and the reference coordinates are magnetic coordinates corresponding to the point formed under no-load condition. The method further comprises applying, to the transmitter, amplitudes of the reference voltage vector corresponding to each point for a period of time proportional to its distortion distance.

In some embodiments, each reference voltage vector comprises a plurality of voltages, in which the number of the voltages is equal to the number of coils of the transmitter. Each of a plurality of voltages in a reference voltage vector may be applied to a corresponding coil of the transmitter. For each of the N point, magnetic coordinates corresponding to the point consist of current amplitudes flowing through coils of the transmitter when applying the reference voltage vector corresponding to the point to the transmitter.

In some embodiments, the method may further comprise filtering out the points that have distortion distances less than a predetermined threshold.

In some embodiments, the coils of the transmitter may generate at least two linearly independent magnetic field vectors.

In some aspects, the present application is directed to a control method for omni-directional wireless power transfer, wherein N distributed points are sampled from a surface of a unit space, the shape of the unit space is the shape of magnetic field generated by coils of a wireless power transfer transmitter, the coordinate values of each point are proportional to the amplitudes of a reference current vector corresponding to the point. The method comprising: (a) adjusting, for each point of the N points, current amplitudes for the transmitter to amplitudes of the reference current vector corresponding to the point for a predetermined period of time, and capturing a voltage amplitude in each coil of the transmitter to form magnetic coordinates corresponding to the point; (b) obtaining, for each point of the N points, a distortion distance between the formed coordinates and reference coordinates corresponding to the point, the reference coordinates are magnetic coordinates corresponding to the point formed under no-load condition; and (c) applying, to the transmitter, amplitudes of the reference current vector corresponding to each point for a period of time proportional to its distortion distance.

In some embodiments, each reference current vector comprises a plurality of currents, in which the number of the currents is equal to the number of coils of the transmitter. Each of a plurality of currents in a reference current vector may be applied to a corresponding coil of the transmitter.

In some embodiments, the method may further comprise filtering out the points that have distortion distances less than a predetermined threshold. In some embodiments, the coils of the transmitter generate at least two linearly independent magnetic field vectors.

In some aspects, the present application is directed to a control system for omni-directional wireless power transfer, wherein N distributed points are sampled from a surface of a unit space, the shape of the unit space is the shape of magnetic field generated by coils of a wireless power transfer transmitter, the coordinate values of each point are proportional to the amplitudes of a reference voltage vector corresponding to the point. The system comprising: means for adjusting, for each point of the N points, voltage amplitudes for the transmitter to amplitudes of the reference voltage vector corresponding to the point for a predetermined period of time, and capturing a current amplitude flowing through each coil of the transmitter to form magnetic coordinates corresponding to the point; means for obtaining, for each point of the N points, a distortion distance between the formed coordinates and reference magnetic coordinates corresponding to the point, the reference coordinates are magnetic coordinates corresponding to the point formed under no-load condition; and means for applying, to the transmitter, amplitudes of the reference voltage vector corresponding to each point for a period of time proportional to its distortion distance.

In some embodiments, the coils of the transmitter generate at least two linearly independent magnetic field vectors.

In some embodiments, the system may further comprise means for filtering out the points that have distortion distances less than a predetermined threshold.

In some aspects, the present application is directed to a machine readable medium having software instructions stored thereon that when executed cause a system to: (a) adjust, for each point of N points, voltage amplitudes for a wireless power transfer transmitter to amplitudes of a reference voltage vector corresponding to the point for a predetermined period of time, and capturing a current amplitude flowing through each coil of the transmitter to form magnetic coordinates corresponding to the point; (b) obtain, for each point of the N points, a distortion distance between the formed coordinates and reference coordinates corresponding to the point, the reference coordinates are magnetic coordinates corresponding to the point formed under no-load condition; and (c) apply, to the transmitter, amplitudes of the reference voltage vector corresponding to each point for a period of time proportional to its distortion distance. The N points are uniformly distributed points sampled from a surface of a unit space, the shape of the unit space is the shape of magnetic field generated by the coils of the transmitter, the coordinate values of each sampled point are proportional to the amplitudes of the reference voltage vector corresponding to the point.

It is to be understood that the features of the various embodiments described herein are not mutually exclusive and can exist in various combinations and permutations. Reference throughout this description to "one example," "an example," "one embodiment," or "an embodiment" means that a particular feature, structure, or characteristic described in connection with the example is included in at least one example of the present technology. Thus, the occurrences of the phrases "in one example," "in an example," "one embodiment," or "an embodiment" in various places throughout this description are not necessarily all referring to the same example. Furthermore, the particular features, structures, routines, steps, or characteristics may be combined in any suitable manner in one or more examples of the technology. The headings provided herein are for convenience only and are not intended to limit or interpret the scope or meaning of the claimed technology.

As used herein, except where the context requires otherwise, the term "comprise" and variations of the term, such as "comprising", "comprises" and "comprised", are not intended to exclude further features, components or steps.

The details of various embodiments of the present disclosure are set forth in the accompanying drawings and the description below.

BRIEF DESCRIPTION OF THE FIGURES

The foregoing and other objects, aspects, features, and advantages of the invention will become more apparent and better understood by referring to the following description taken in conjunction with the accompanying drawings, in which.

Figure 1:
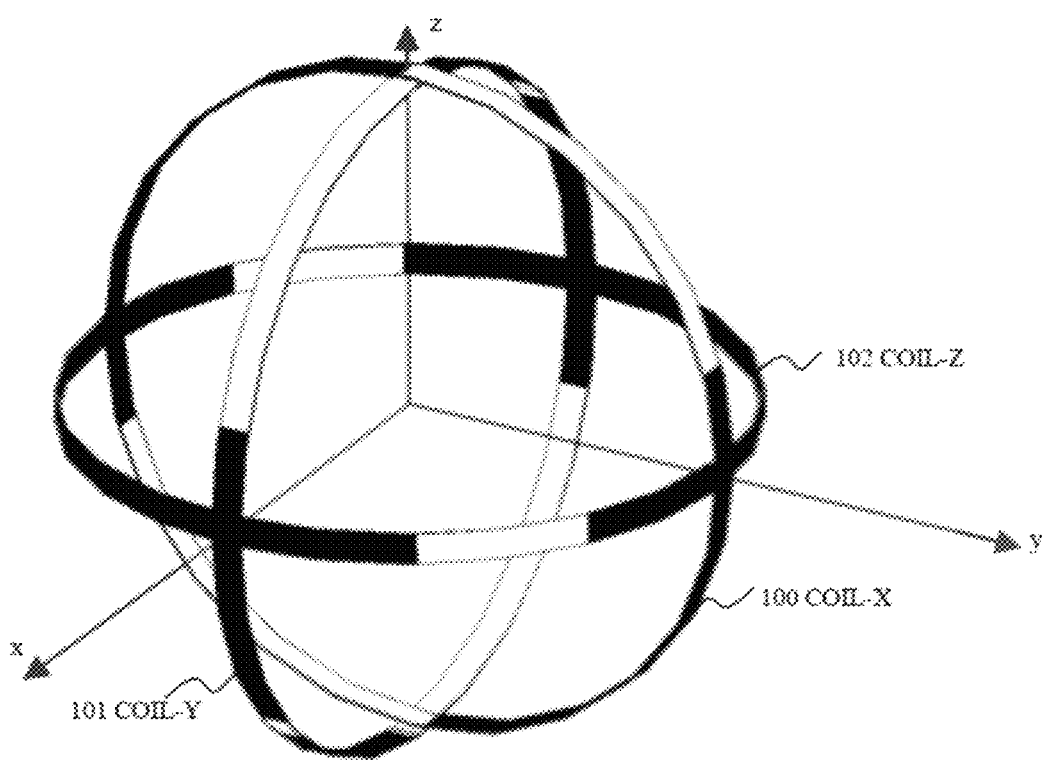
FIG. 1 is a schematic diagram of an embodiment of a transmitter structure for wireless power transmitter with three orthogonal closed loop coils.
Figure 2:
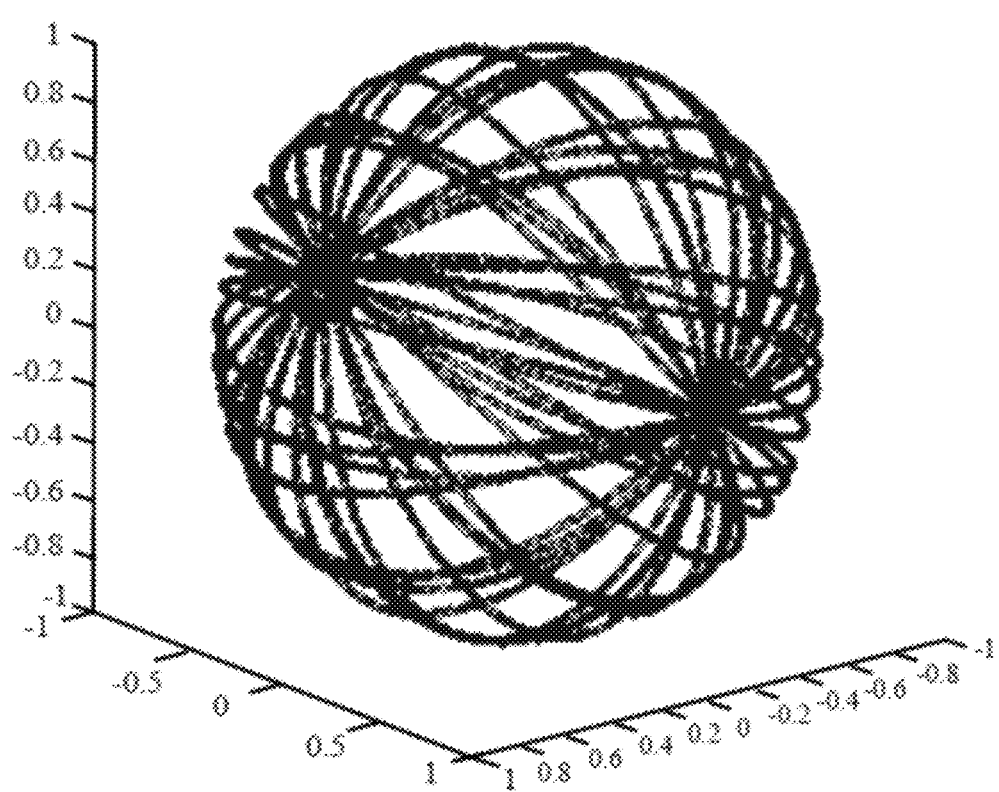
FIG. 2 is a schematic diagram of an embodiment of the trajectory of the magnetic field vector from Viewpoint [1, 1, 1] of a 3-D omni-directional wireless power transmitter under the Non-identical Current Control.
Figure 3:
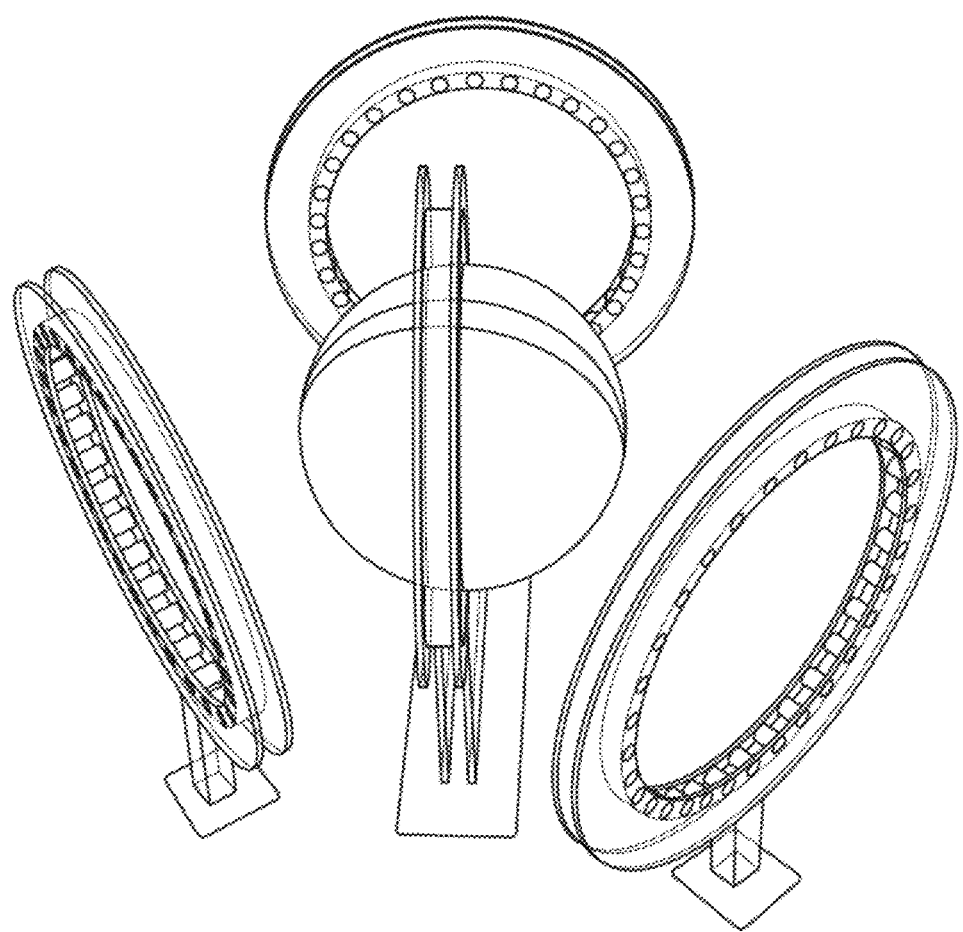
FIG. 3 is a photograph showing that 3 LED loads are powered by three receiver resonators placed around a 2-D omni-directional wireless power transmitter excited with 2 coil currents of the same magnitude but with a phase angle difference of 90 degrees.
Figure 4:
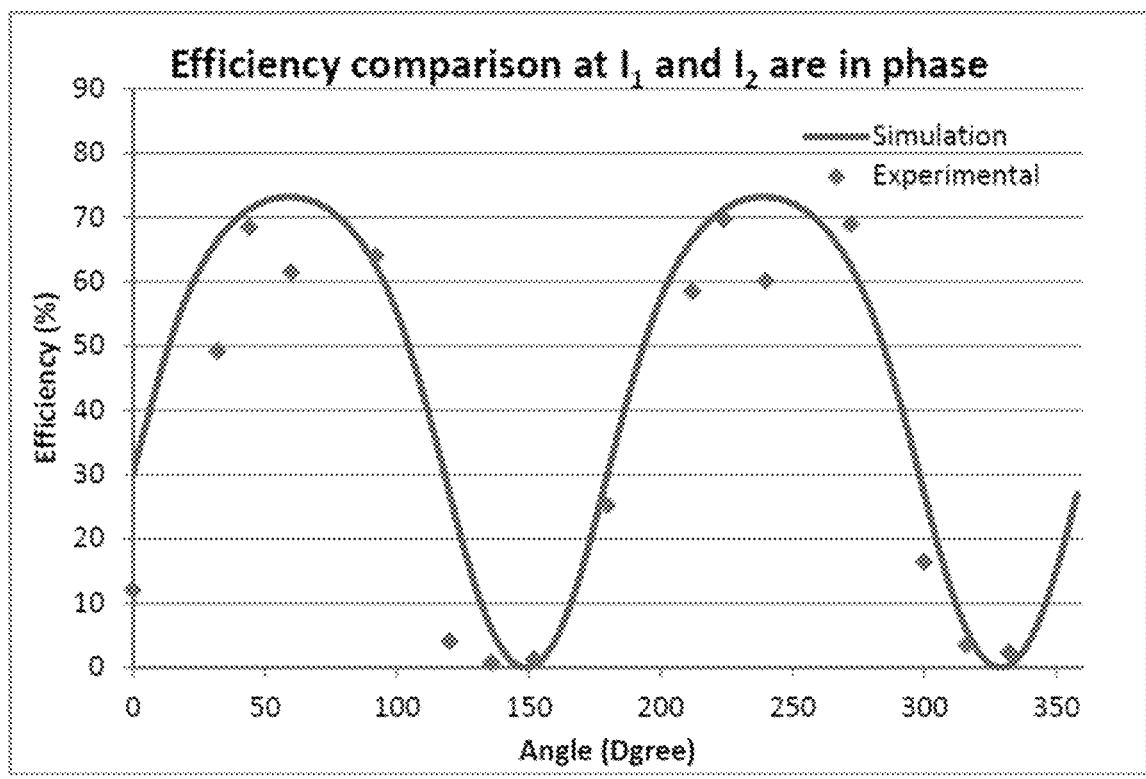
FIG. 4 shows the measured and theoretical energy efficiency under the Identical Current Control.
Figure 5:
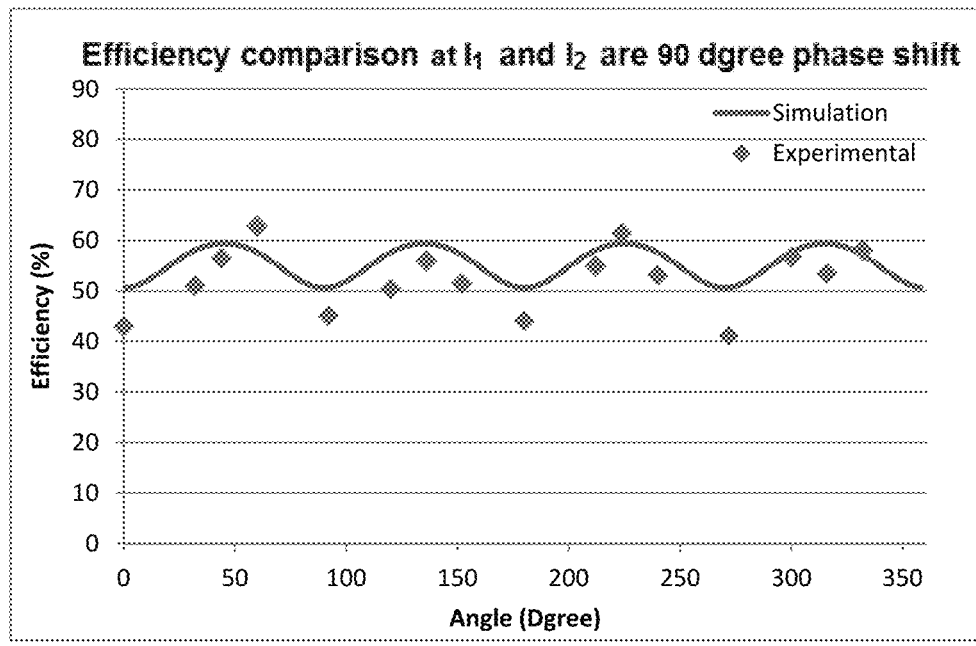
FIG. 5 shows the measured and theoretical energy efficiency under the Non-identical Current Control.

The features and advantages of the present invention will become more apparent from the detailed description set forth below when taken in conjunction with the drawings, in which like reference characters identify corresponding elements throughout. In the drawings, like reference numbers generally indicate identical, functionally similar, and/or structurally similar elements. Also, the drawings are not necessarily to scale, with an emphasis instead generally being placed upon illustrating the principles of the invention.

DETAILED DESCRIPTION OF THE INVENTION

Below, the invention will be explained in detail in combination with the accompanying drawings. For the convenience of description, the invention is described with the use of a 3-dimensional wireless power transfer system for the 3-D space (i.e. x, y and z planes). It should be stressed that the same concept can be applied to a 2-dimensional one (for x and y planes). Although the principle of the invention is explained with the use of 3 orthogonal circular transmitter coils, it should be understood that the invention can be applied to transmitter coils of other polygonal shapes such as square, rectangle and hexagon. In addition, while the ideal situation is to have the 3 transmitter coils perpendicular to each other, the principle described in this invention can be applied to transmitter coils slightly deviated from the ideal orthogonal structure, possibly due to the requirements of the form factor restriction of a particular commercial product.

Based on the "omni-directional" wireless power transfer under Non-identical Current Control previously reported by WMNG1 and WMNG2, the inventors discover that the presence of the loads (i.e. power absorption) will deform the spherical shape of the magnetic field generated by the orthogonal transmitter coils. The geometry of the magnetic field surface can be mathematically monitored by a computational method as explained later herein. Such magnetic field shape monitoring can be done periodically in order to detect if there is any change of status in terms of the number of the loads and the positions of the loads.

Before the method of the present application is discussed, it is necessary to explain how to describe the magnetic field surface and monitoring the shape of the surface.

When inspecting the magnetic field of a circular coil conducting current, the magnetic field direction at the coplanar center would always be normal to the coil plane. This could be proved by applying Biot-Savart Law integrating over the coil loop, as follows:

$$dB = \frac{\mu_0 I d1 \times \hat{r}}{4\pi |r|^2}; \tag{7}$$

where dl is an infinitesimal length of a conductor carrying current I; $\hat{r}$ is the unity vector of the displacement vector from the conductor segment dl to the point that is investigated; $\mu_0$ denotes permeability of vacuum and its value is typically $4\pi \times 10^{-7}$ Tm/A. The term on the left side dB indicates the partial magnetic field contributed by dl.

Integrating dB of equation (7) over the circular coil would give the magnetic field at the coplanar center, as follows:

$$dB_o = \frac{\mu_0 I d1 \times \hat{r}}{4\pi |r|^2} = \frac{\mu_0 I d|1|\sin\theta}{4\pi |r|^2} \cdot (\hat{1} \times \hat{r}); \tag{8}$$

$$B_o = \frac{\mu_0 I}{4\pi |r|^2} \oint dl \cdot (\hat{1} \times \hat{r}) = \frac{\mu_0 I}{4\pi |r|^2} 2\pi r \cdot (\hat{1} \cdot \hat{r}) = \frac{\mu_0 I}{2r} \cdot (\hat{1} \cdot \hat{r}); \tag{9}$$

where $\hat{1}$ is the unit vector along length l. It is shown in equation (9) that the magnetic field at the center has a direction that is perpendicular with both the circular loop l and radius vector r and a scalar magnitude value of $\mu_0 I/(2r)$ that is proportional to the current I flowing through the circular coil. Thus, a vector starting at the center of a plane coil with the magnitude of k·I may be used to represent the magnetic field at the center of the coil, where k is a constant that equals to $\mu_0/(2r)$.

Consider the situation that multiple identical circular coils have the same center position but different angular orientations (e.g. orthogonal), the magnetic field at the center can be simply added up by super-position theorem. Since the curl of $B_0$ in equation (9) is zero, the summed-up magnetic field should also have a curl of zero, which makes the multi-coil system has a similar central magnetic field pattern as a single coil, where the new single coil has a normal vector of the super-positioned vector at the center.

As for a three-coil system as shown in FIG. 1, the three identical circular coils have the same center positions and they are perpendicular to each other, which causes the mutual inductances of each pair among them to be zero. The single magnetic fields due to each coil are also independent from each other and perpendicular to each other as well. The simultaneous magnetic field vector at the center can be represented in the following form.

$$B_0(t) = k(I_x(t)\hat{x} + I_y(t)\hat{y} + I_z(t)\hat{z}) \tag{10}$$

where t represents time; $I_x(t)$ is the current flowing through the coil that is perpendicular with the x axes, $I_y(t)$ and $I_z(t)$ are the currents flowing through the rest two coils respectively; $\hat{x}$, $\hat{y}$ and $\hat{z}$ are the unit vectors in the x-, y- and z-axis, respectively. And the current flow in the three coils has a form in the following equations:

$$\begin{cases} I_x(t) = I_{m_x} \sin(\omega_x t + \theta_x) \\ I_y(t) = I_{m_y} \sin(\omega_y t + \theta_y) \\ I_z(t) = I_{m_z} \sin(\omega_z t + \theta_z) \end{cases} \tag{11}$$

where $I_{m_x}$, $I_{m_y}$ and $I_{m_z}$ are the AC current magnitudes, $\omega_x$, $\omega_y$ and $\omega_z$ are the angular frequencies and $\theta_x$, $\theta_y$ and $\theta_z$ are the angular phase shifts of the currents.

Since the magnetic vector points can oscillate in two directions (along the same line), the center magnetic field vector $B_{omax}$ (i.e. the magnetic field vector pointing from the origin (0, 0, 0) of the 3-dimensional space to the magnetic field surface) is used to represent the magnetic field pattern in present application to describe the shape of the magnetic field, that is:

$$B_{omax} = k(I_{m_x}\hat{x} + I_{m_y}\hat{y} + I_{m_z}\hat{z}) \tag{12}$$

And the maximum magnitude of $B_{omax}$ is related to the current magnitudes in the three coils, as follows:

$$|B_o|_{max} = k\sqrt{I_{m_x}^2 + I_{m_y}^2 + I_{m_z}^2} \tag{13}$$

Figure 6:
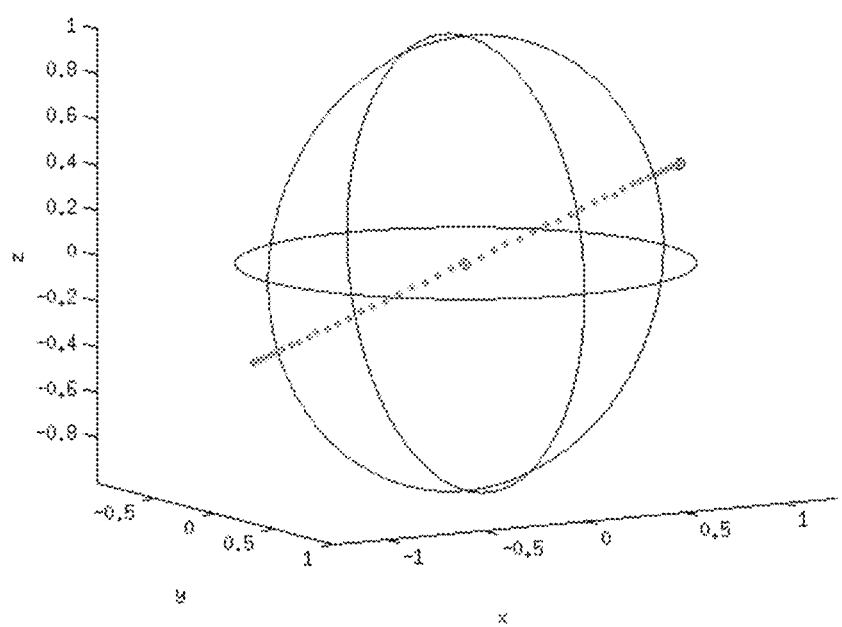
FIG. 6 is a schematic diagram of a trajectory of a magnetic field vector at the center of the three coils with in-phase currents.

FIG. 6 shows the exemplary trajectory of a magnetic field vector at the center of a three-coil system with currents that have the same frequency and phase-shift. But the magnitudes of the currents are $I_{m_x}=0.6$, $I_{m_y}=0.8$ and $I_{m_z}=0.5$ respectively. It can be seen that the magnetic vector under this operating condition moves in the two directions along a straight line. This is a typical case of "directional" wireless power control. The two opposite directions of the line of the vector movement in FIG. 6 can be considered as "dominant magnetic field vector directions".

Figure 7:
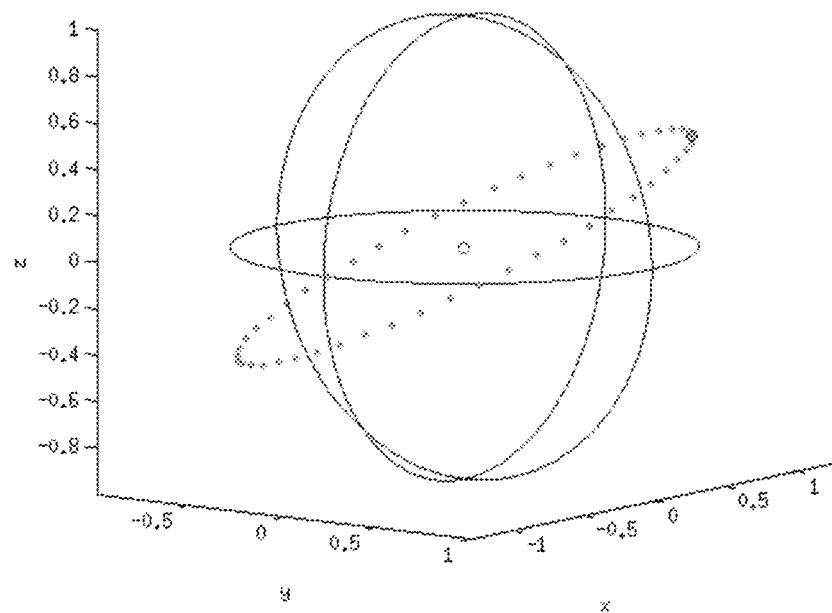
FIG. 7 shows an example of a rotational vector trajectory when the currents flowing through three coils have different phase angles.

For the non-identical current control method proposed by WMNG1, the currents in the three coils $I_x(t)$, $I_y(t)$ and $I_z(t)$ are not coincidently in-phase (but still using the same frequency). For example, if the three-coil system is used as a wireless energy transfer transmitter and the three coils are driven with exactly the same voltage source with the same frequency and phase, with multiple receiver loads applied to the system, the currents in the three coils are immediately out-of-phase. But when the three currents are in-phase, the magnetic field vector trajectory is on a line, $B_{omax}$ is considered as the "Dominant Magnetic Field Oscillation Direction". When they are out-of-phase, the trajectory becomes an ellipse or a circle. It is not straightforward to find the "Dominant" direction for a circular trajectory (which is a special case when there is no load). But for elliptical trajectories, the direction of the major axis (i.e. transverse diameter) can be regarded as the "Dominant" direction of the rotating magnetic flux. FIG. 7 shows an example of a rotational vector trajectory when the currents flowing through three coils have different phase angles. The currents flowing through the three coils in FIG. 7 are represented by equation (14):

$$\begin{cases} I_x(t) = 0.6\sin(\omega t) \\ I_y(t) = 0.8\sin(\omega t + 0.5) \\ I_z(t) = 0.5\sin(\omega t) \end{cases} \tag{14}$$

Figure 8:
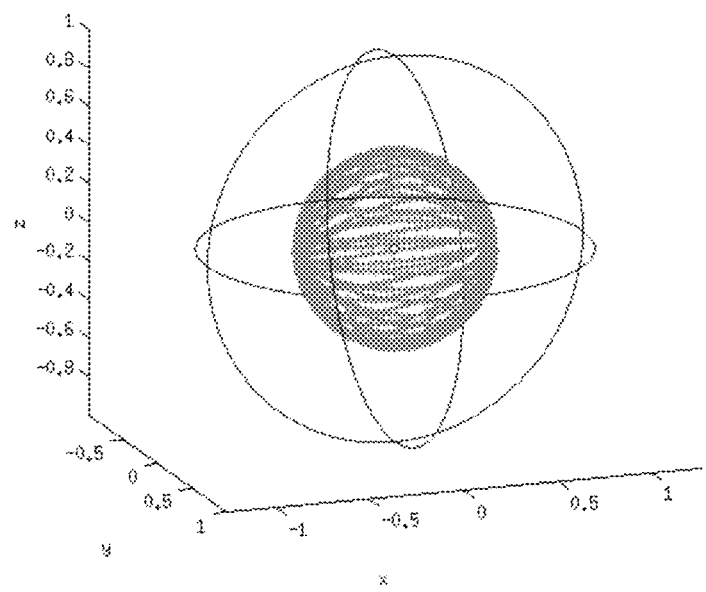
FIG. 8 is a schematic diagram of a trajectory of magnetic field vector at the center of the three orthogonal closed loop coils.

WMNG2 proposes one control method for omni-directional wireless power transfer by forcing the magnetic field vector to rotate on two degrees of freedom with two frequencies so that the trajectory would cover the entire sphere, as shown in FIG. 8. The currents used are as follows:

$$\begin{cases} \omega_1 = 2\pi \cdot 1000 \\ \omega_2 = 2\pi \cdot 25 \\ I_x(t) = 0.5\sin(\omega t) \\ I_y(t) = 0.5\sin(\omega_2 t)\sin\left(\omega_1 t + \frac{\pi}{2}\right) \\ I_z(t) = 0.5\sin\left(\omega_2 t + \frac{\pi}{2}\right)\sin\left(\omega_1 t + \frac{\pi}{2}\right) \end{cases} \tag{15}$$

Figure 9:
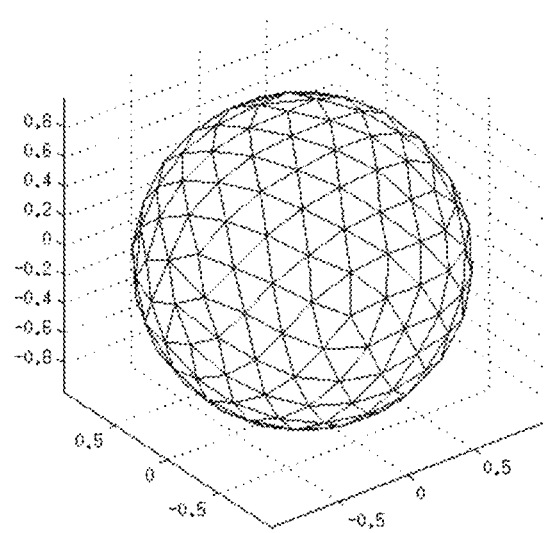
FIG. 9 is a schematic diagram of the sampling of a sphere.

The spherical surface can be described by N uniformly distributed points. In principle, other forms of distributed points may be applicable. But uniformly distributed points are preferred because it is there are standard techniques to generate them easily. For example, in one embodiment, the spherical surface can be sampling uniformly based on the method suggested by Semechko (See, A. Semechko, "Uniform sampling of a sphere." http://www.mathworks.com/matlabcentral/fileexchange/37004-uniform-sampling-of-a-sphere, May, 2013.), and the N sampled points are used to represent the surface of the sphere. FIG. 9 shows the sampled points of the surface, where several hundred points are sampled over the sphere. The number of sampled points (N) depends on the resolution requirements and the computational power of the processor used in the real-time control. To make sure that the magnetic field vector would cover the entire sphere uniformly, focusing (or shooting) the magnetic flux towards these N points is a good solution.

If the three orthogonal coils are energized so that the magnetic field vector points at each of the points for one small period of time periodically, all the points receive the same magnetic flux evenly and repeatedly. The magnetic field vector would be considered as "shooting" to all directions uniformly. This approach will be called "Spherical Magnetic Flux Control" hereafter in this application. The omni-directional wireless power transfer for this spherical surface model can be achieved with the combined use of (i) the non-identical current control previously reported by WMNG1 and WMNG2 and (ii) this approach of Spherical Magnetic Flux Control. Such a "spherical shape of the magnetic field" will be deformed when load or loads absorbing power are in the proximity of the omni-directional transmitter.

In the following example, the voltage amplitude control is used since it is easier to build voltage-controllable AC power sources. All the voltage sources are in-phase in this example. N points are sampled uniformly from a unit sphere based on the method suggested by Semechko, wherein N is a positive integer. Let N=200, and the coordinates of the N points are applied to the three voltage amplitudes as follows:

$$\begin{cases} P(n) = <P_x(n), P_y(n), P_z(n)> & \text{(coordinates)} \\ n \in [1, 200]\ n \in \mathbb{Z} & \text{(index)} \\ V_x(t) = k_v P_x(n)\sin(\omega t) \\ V_y(t) = k_v P_y(n)\sin(\omega t) \\ V_z(t) = k_v P_z(n)\sin(\omega t) \end{cases} \tag{16}$$

where $k_v$ is the adjustable voltage coefficient; $P_x(n)$, $P_y(n)$ and $P_z(n)$ are the coordinates in the x-, y- and z-plane respectively of the $n^{th}$ point of the N points on the surface of a unit sphere, where n is a positive integer; $V_x(t)$, $V_y(t)$ and $V_z(t)$ constitute a reference voltage vector corresponding to the $n^{th}$ point, wherein $V_x(t)$, $V_y(t)$ and $V_z(t)$ also can be called amplitudes of the reference voltage vector; and the coordinates values of the $n^{th}$ point are proportional to the amplitudes of the reference voltage vector. For the N point, N reference voltage vectors can be obtained. Each reference voltage vector comprises a plurality of voltages, and the number of the voltages is equal to the number of coils of the transmitter. Each of a plurality of voltages in a reference voltage vector will be applied to a corresponding coil of the transmitter; for example, $V_x(t)$ is applied to coil x, $V_y(t)$ is applied to coil y and $V_z(t)$ is applied to coil z. When each reference voltage vector is applied to the transmitter, the distortion of the magnetic field shape can be detected by comparing changes of currents following through the coils of the transmitter under no-load condition and load condition for each point. It should understand that the N points can be sampled uniformly from a surface of any unit space, as long as the shape of the unit space is the same as the shape of magnetic field generated by coils of the transmitter.

The currents in the three coils when there is/are one or more loads (or receivers) can be solved by the following equation (17) of KVL (Kirchhoff Voltage Law). Assume there are n loads, $L_1, L_2 \ldots L_n$, in the system:

$$\begin{bmatrix} R_x + jX_x & 0 & 0 & j\omega M_{x-L_1} & j\omega M_{x-L_2} & \cdots & j\omega M_{x-L_n} \\ 0 & R_y + jX_y & 0 & j\omega M_{y-L_1} & j\omega M_{y-L_2} & \cdots & j\omega M_{y-L_n} \\ 0 & 0 & R_z + jX_z & j\omega M_{z-L_1} & j\omega M_{z-L_2} & \cdots & j\omega M_{z-L_n} \\ j\omega M_{L_1-x} & j\Omega M_{L_1-y} & j\omega M_{L_1-z} & R_{L_1} + jX_{L_1} & j\omega M_{L_1-L_2} & \cdots & j\omega M_{L_1-L_n} \\ j\omega M_{L_2-x} & j\omega M_{L_2-y} & j\omega M_{L_2-z} & j\omega M_{L_2-L_1} & R_{L_2} + jX_{L_2} & \cdots & j\omega M_{L_2-L_n} \\ \vdots & \vdots & \vdots & \vdots & \vdots & \ddots & \vdots \\ j\omega M_{L_3-x} & j\omega M_{L_3-y} & j\omega M_{L_3-z} & j\omega M_{L_3-L_1} & j\omega M_{L_3-L_2} & \cdots & R_{L_3} + jX_{L_n} \end{bmatrix} \begin{bmatrix} I_x \\ I_y \\ I_z \\ I_{L_1} \\ I_{L_2} \\ \vdots \\ I_{L_n} \end{bmatrix} = \begin{bmatrix} V_x \\ V_y \\ V_z \\ V_{L_1} \\ V_{L_2} \\ \vdots \\ V_{L_n} \end{bmatrix}; \quad (17)$$

where $R_m$ is the equivalent serial resistance of the coil m, including any resistive load connected to the coil; $X_m$ is the equivalent serial reactance of the coil m and is equal to $\omega K_m - 1/(\omega C_m)$, wherein $K_m$ is the coil m inductance, and $C_m$ is the equivalent capacitance, including the parasitic capacitance as well as the externally connected capacitor on the coil m. The subscript m=x, y, z, $L_1, L_2, \ldots$ to $L_n$, where x, y and z refer to the three transmitter coils and $L_1$ to $L_n$ refer to the load coils. $M_{g-h}$ stands for the mutual inductance between coil g and h, therefore $M_{g-h}$ is equal to $M_{h-g}$ in equation (17). "j" indicates the operator for the Imaginary Part. Notice that there are six terms in equation (17), i.e. the mutual inductances among coil x, y and z. This is because the three coils are perpendicular to each other while sharing the same center position.

When there is no load (or receivers) in the proximity of the three-coil structure transmitter shown in FIG. 1, and the voltage is controlled as described in equation (16), the currents in the three coils are proportional to the voltages. Thus when plotting the maximum magnetic field vector at the center ($B_{omax}$), the surface of the magnetic field vector for the N points will form a symmetric spherical shape as shown in FIG. 9.

Now consider a receiver consisting of a plane inductor, a serially connected capacitor and a serially resistive load, the resonant frequency of this circuit exactly matches the transmitter's driving frequency. Thus the receiver may easily receive some power from the transmitter when it is placed near the transmitter. Using equation (17), it is easy to find out the currents in the three transmitter coils. In practice, the currents can also be measured with current sensors. Due to some power transferred to the load, the current pattern is different from that when there is no load, and thus the maximum magnetic field vector at the center ($B_{omax}$) pattern is distorted under a loaded condition.

Table 1 shows an example of the parameters for omnidirectional wireless power transfer systems with a single load:

TABLE 1

| Coil Name | Radius m | Turns | Self-Inductance μH | Capacitance nF | Resistance Ω | Center Vector <x, y, z> | Normal Vector <x, y, z> |
|---|---|---|---|---|---|---|---|
| Transmitter-x | 0.155 | 14 | 94.2117 | 1 | 1 | <0, 0, 0> | <1, 0, 0> |
| Transmitter-y | 0.155 | 14 | 94.2117 | 1 | 1 | <0, 0, 0> | <0, 1, 0> |
| Transmitter-z | 0.155 | 14 | 94.2117 | 1 | 1 | <0, 0, 0> | <0, 0, 1> |
| Receiver-1 | 0.155 | 14 | 94.2117 | 1 | 1 | <0.173, 0.173, 0.173> | <-1, -1, -1> |

Figure 10:
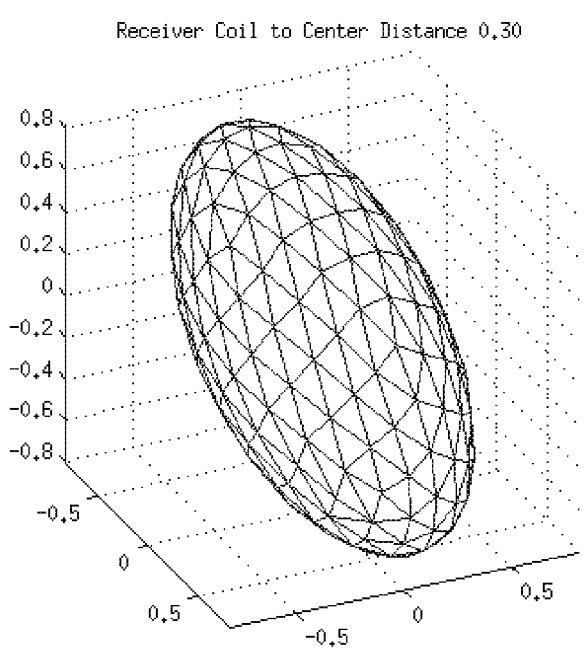
FIG. 10 is a distortion of the envelope of the maximum magnetic field vector at the center of the three coils with a single load.

If the receiver coil of the load is placed in the position with the 3-D coordinates (0.173, 0.173, 0.173) and faces the origin of the transmitter, the resulting transmitting coil currents of FIG. 1 can be obtained from equation (17) or practically measured with current sensors and used to reconstruct the magnetic field surface as shown in FIG. 10. It can be seen that the shape of the magnetic field surface is deformed from the original spherical shape (under no load condition) to an oval or discus shape. In this example, the receiver coil is facing the center of the transmitter, and the direction of the deformation is as if the magnetic field of the load is "squishing" the magnetic field surface, as the deformation comes from the direction of the load. Another important observation is that although there is only one load placed near the transmitter, the magnetic field surface is symmetrical at the center.

Figure 11:
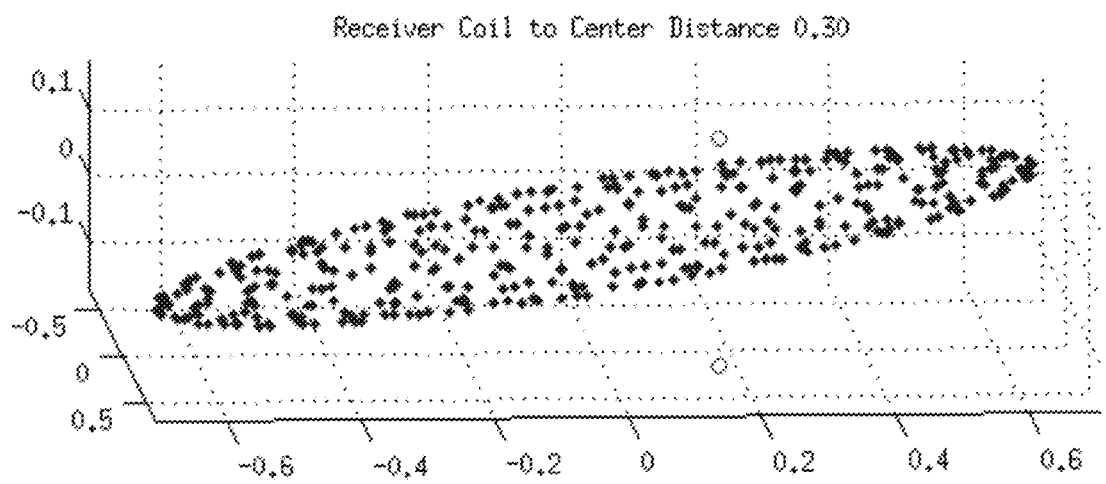
FIG. 11 is a distortion of the envelope of the maximum magnetic field vector at the center of the three coils with multiple loads.

When multiple receivers are placed near the three-coil transmitter, the magnetic field surface will be distorted according to the superposition principle. For example, if the two loads are placed at the coordinates (0.173, 0.173, 0.173) and (0.173, 0.173, −0.173), the resulting transmitter coil currents can be obtained from equation (17) or practically measured with current sensors and used to plot the magnetic field surface as shown in FIG. 11. It can be seen that the surface is distorted from the original spherical shape as if it is squished from the two sides of the load directions.

As discuss above, the position of loads can be reflected by the distortion of the magnetic field surface. In other words, the load location detection can be performed by detecting the distortion of the magnetic field surface.

In an embodiment, the present application is directed to a control method for omni-directional wireless power transfer, which involves the load detection based on the magnetic field shape and the power control that focuses the power flow towards the detected load(s) in order to maximize the energy efficiency of the wireless power transfer. Specifically, as discussed in connection with equation (16), the N uniform distributed points are sampled from a surface of a unit space, the shape of the unit space is the shape of magnetic field generated by coils of a wireless power transfer transmitter, and the values of coordinates of each point are proportional to the amplitudes of a reference voltage vector corresponding to the point. The method comprises obtaining reference magnetic coordinates corresponding to each point under no-load condition (step 1); periodically obtaining new magnetic coordinates corresponding to each point (step 2); detecting the distortion of the magnetic field surface by comparing the new magnetic coordinates with reference magnetic coordinates corresponding to each point (step 3); and making the magnetic vector of the transmitter point at the N points with time proportional to their distortion distances (step 4).

At step 1, a magnetic field in all directions can be generated in the 2-dimensional or 3-dimensional space based on the non-identical current-control method for omni-directional wireless power transfer disclosed by the previous patent application (U.S. Ser. No. 13/975,409). As discussed above, when there is no load (receivers) in the proximity of the three-coil structure transmitter shown in FIG. 1, and the voltage is controlled as described in equation (16), the currents in the three coils are proportional to the voltages. Given a certain set of currents for the transmitter coils, a reference magnetic field spherical surface represented by N sampled points can be constructed. For each point, the reference coordinates for the point-n $(x_{R\_n}, y_{R\_n}, z_{R\_n})$ are represented as $<P_x(n), P_y(n), P_z(n)>$ in equation (16). Note that the values of these coordinates will control the amplitudes of the three voltages $(V_x(t), V_y(t)$ and $V_z(t))$ in the reference vector corresponding the point as described in equation (16). Therefore, the three voltages should generate "non-identical" currents in the transmitter coils, which is a condition for true omni-directional wireless power transfer.

The "reference" magnetic field spherical surface (represented by N points) can be constructed by applying the reference voltage vectors described in equation (16) to the N points in sequence without any load in the proximity of the transmitter coils (i.e., no-load conditions). The corresponding current values $I_{mx}$, $I_{my}$ and $I_{mz}$ in the coils of the transmitter for each of these N points are then captured. In practice, these current values may be the scaled-down versions obtained from the current sensors. Based on equation (12), these three current components form the resultant magnetic field vector. In one embodiment, the current values $I_{mx}$, $I_{my}$ and $I_{mz}$ obtained for each of the N points form magnetic coordinates corresponding to the point, which can be taken as the "reference coordinates" corresponding to the point. That is, for the point-h, the "reference" coordinates $P_{Rh}=(x_{R\_h}, y_{R\_h}, z_{R\_h})=(I_{mx\_h}, I_{my\_h}, I_{mz\_h})$, where the three currents are captured at point-h under no-load conditions.

Since the reference surface (obtained under the no-load conditions) is represented by N points, this set of reference coordinates corresponding to N points is represented as:

$$P_R=\{P_{R1}, P_{R2}, \ldots, P_{Rj}, \ldots, P_{RN}\} \tag{18}$$

where the $h^{th}$ reference surface point $P_{Rh}$ is represented by the coordinates $(x_{R\_h}, y_{R\_h}, z_{R\_h})$.

At step 2, currents in the coils of the transmitter are monitored and captured periodically or in real time to reconstruct the magnetic field surface, and the voltage is also controlled as described in equation (16). Voltage amplitudes for the transmitter include the voltage amplitude applied to each coil of the transmitter. For example, for each point of the N points, voltage amplitudes for the transmitter are adjusted to amplitudes of the reference voltage vector corresponding to the point for a small period of time, and current amplitudes flowing through coils of the transmitter are captured to form magnetic coordinates corresponding to the point.

When a load or several loads are placed near the transmitter coils and wireless power transfer occurs, the resultant transmitter coil currents will be different from those under no-load conditions. The loaded transmitter coil currents can be captured at the N points for constructing a "loaded magnetic field surface". Under such loaded conditions, the current values of $I_{mx}$, $I_{my}$ and $I_{mz}$ flowing through the coils of the transmitter for each of these N points are used to obtain the maximum magnitude of the magnetic field vector $|B_o|_{max}$ for each point of these N points. For the point-h, the "loaded" magnetic coordinates $P_{Lh}=(x_{L\_h}, Y_{L\_h}, z_{L\_h})=(I_{mx\_h}, I_{my\_h}, I_{mz\_h})$, where the three currents in the transmitter coils are captured for point-h under loaded conditions. As explained previously, such loaded surface will be distorted from the spherical shape. As such distorted surface is also represented the N points, this set of loaded magnetic coordinates corresponding to N points is represented as:

$$P_L=\{P_{L1}, P_{L2}, \ldots, P_{Lj}, \ldots, P_{RN}\} \tag{19};$$

where the $h^{th}$ point $P_{Lh}$ is represented by the coordinates $(x_{L\_h}, y_{L\_h}, z_{L\_h})$.

At step 3, for each point of the N points, a distortion distance between the formed coordinates and reference coordinates corresponding to the point is obtained. For example, the distance $D_h$ for the $h^{th}$ point between the formed coordinates and reference coordinates, which is called the distortion distance herein, is:

$$D_h=\sqrt{(x_{R\_h}-x_{L\_h})^2+(y_{R\_h}-y_{L\_h})^2+(z_{R\_hdh}-z_{L\_h})^2} \text{ for } h=1 \text{ to } N \tag{20}.$$

Therefore a set of N distortion distances can be derived as:

$$D=\{D_1, D_2, \ldots, D_N\} \tag{21};$$

Figure 12:
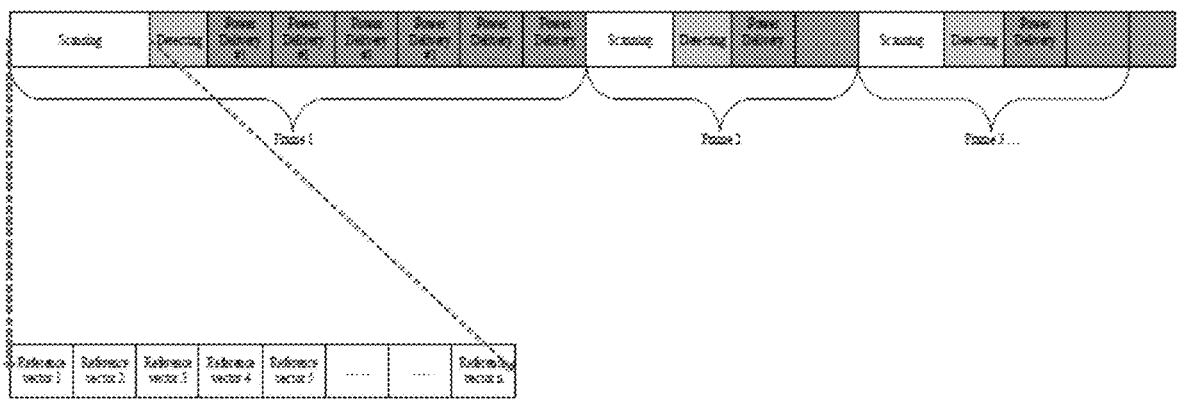
FIG. 12 is a time frame diagram for wireless power system with three orthogonal coils using discrete amplitude modulation method.

At step 4, the magnetic vector of the transmitter is pointed at the N points with time proportional to their distortion distances. For example, amplitudes of the reference voltage vector corresponding to each point as described in equation (16) are applied to the transmitter for a period of time proportional to the distortion distance for the point. The distortion distance can be considered as a measure of the energy transfer. By making the magnetic vector point at the N different surface points with time proportional to their distortion distances in a time sequence, the higher energy efficiency can be achieved. The above method does not need any electric parameters of the receiver coil in the load, which is also called as a discrete amplitude modulation approach. The implementation of the method mainly involves a 3-stage process as shown in FIG. 12, including (i) scanning (i.e. step 2), (ii) load detecting (i.e. step 3) and (iii) power delivering (i.e. step 4). For example, within a repetitive excitation period of $T_{frame}$, known as a time frame, the time for the scanning and detecting stages should be relatively small so that most of the time frame is used for power delivery. Let $T_P$ be the total time available for power delivery within each time frame ($T_P<T_{frame}$). $T_P$ can be sub-divided into many small time samples $T_{SP}$, i.e. power delivery blocks in FIG. 12. The number of power delivery blocks (i.e. charging time) for each loaded surface point should be proportional to the distortion distance in equation (21).

And the distortion distance in equation (21) can be normalized. For the $h^{th}$ distortion distance ($d_h$), it can be defined as $$d_h = \frac{D_h}{\sum_{X=1}^{N} D_X}; \quad (22)$$

where $$\sum_{X=1}^{N} D_X$$

is the sum of all the distortion distances. Therefore, the time for applying a magnetic field vector to the $h^{th}$ surface point can be expressed as:

$$T_h = d_h T_P \quad (23).$$

The total time for power delivery is:

$$T_P = \sum_{X=1}^{N} d_X T_P. \quad (24)$$

In practice, however, those distortion distances that are too small (for example, less than a certain small threshold) can be ignored. Therefore, in some embodiments, the method further comprises ignoring some of the surface points that have distortion distances of the lower level (e.g. the smallest 20% of the distorted distances) and direct the magnetic vector to primarily to the surface points that have distortion distances of higher values (e.g. the highest 80% of the distorted distances). Such lower threshold can be set according the specific applications.

This approach discussed above enjoys the advantageous features that there is no need to know the number of loads and the electric parameters of the loads. As long as the loads are compatible, the transmitter coils will focus the magnetic flux to the surface area that causes the deformation for spherical surface most. In general, a compatible load should contain a well-tuned receiver coil for the operating frequency of the wireless power transmitter system. Compatibility checks of the loads can further be enhanced by wireless communication links between the compatible loads and the transmitter control systems.

Figure 13:
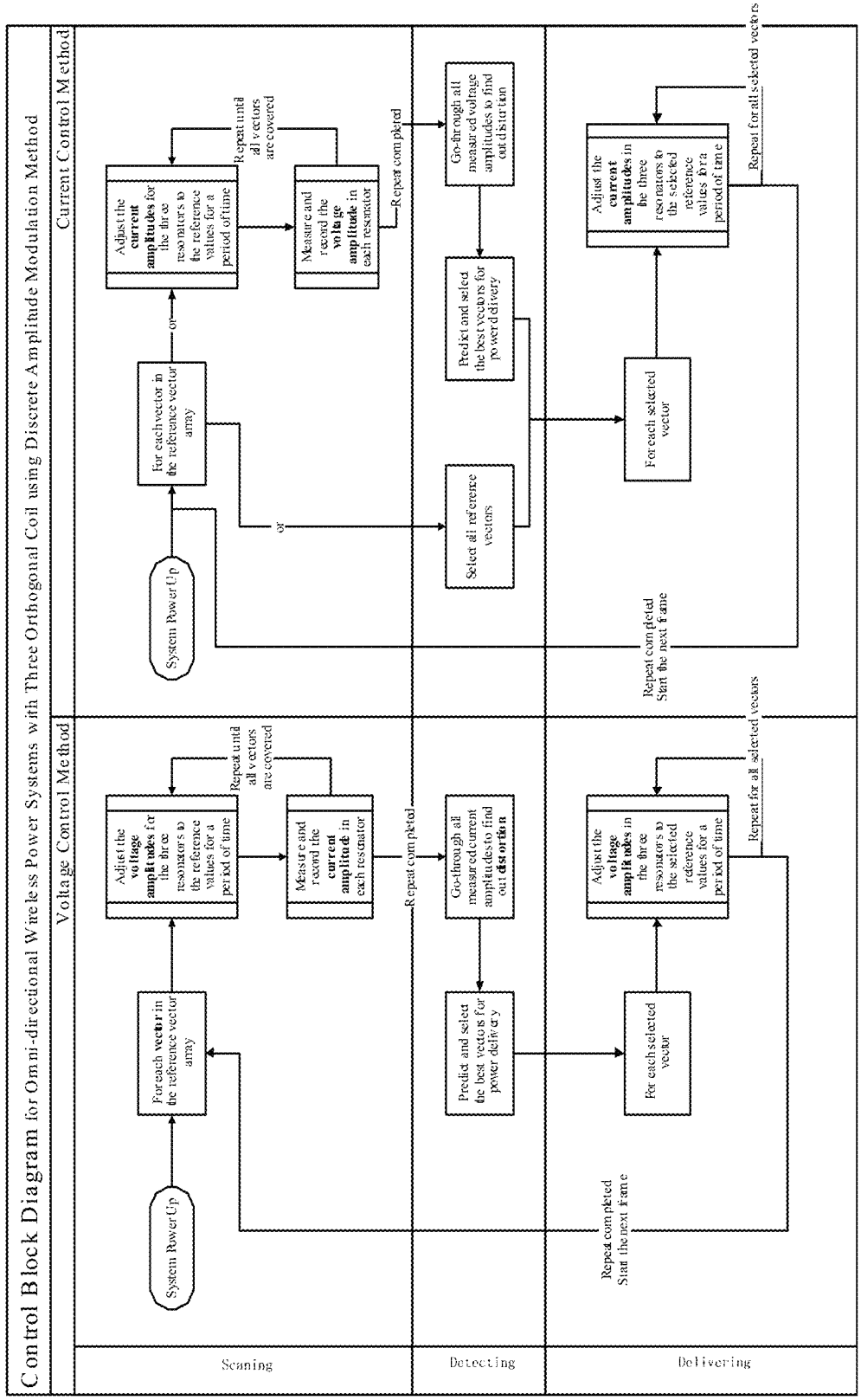
FIG. 13 shows block diagrams of the voltage-control and current-control implementations for omni-directional wireless power transfer.

The implementation of this above approach can be realized by either voltage control or current control of the power inverter that drives the transmitter coils. FIG. 13 depicts block diagrams of the voltage-control and current-control implementations. For the voltage control, the power inverter is used to apply voltage to the transmitter coils in order to generate a magnetic field vector for a small period of time to each of the selected surface points. For each selected surface point, the currents in the transmitter coils are measured and used to generate the magnetic field vector. Consequently, a vector array consisting of all the loaded surface points can be established after the magnetic field vector has scanned all the selected surface points. This is the scanning process. The distortion distances of all of the loaded surface points can then be obtained in the detecting process by comparing with points on the reference magnetic field surface. Then, in the power delivering process, the voltage vector is applied to all of the selected surface points with time proportional to the distortion distances. As shown in FIG. 13, similar concept can be applied based on current control, in which current magnitudes of the transmitter coils are controlled. Then the voltages across the transmitter coils are measured and used to determine the loaded surface points.

Figure 14:
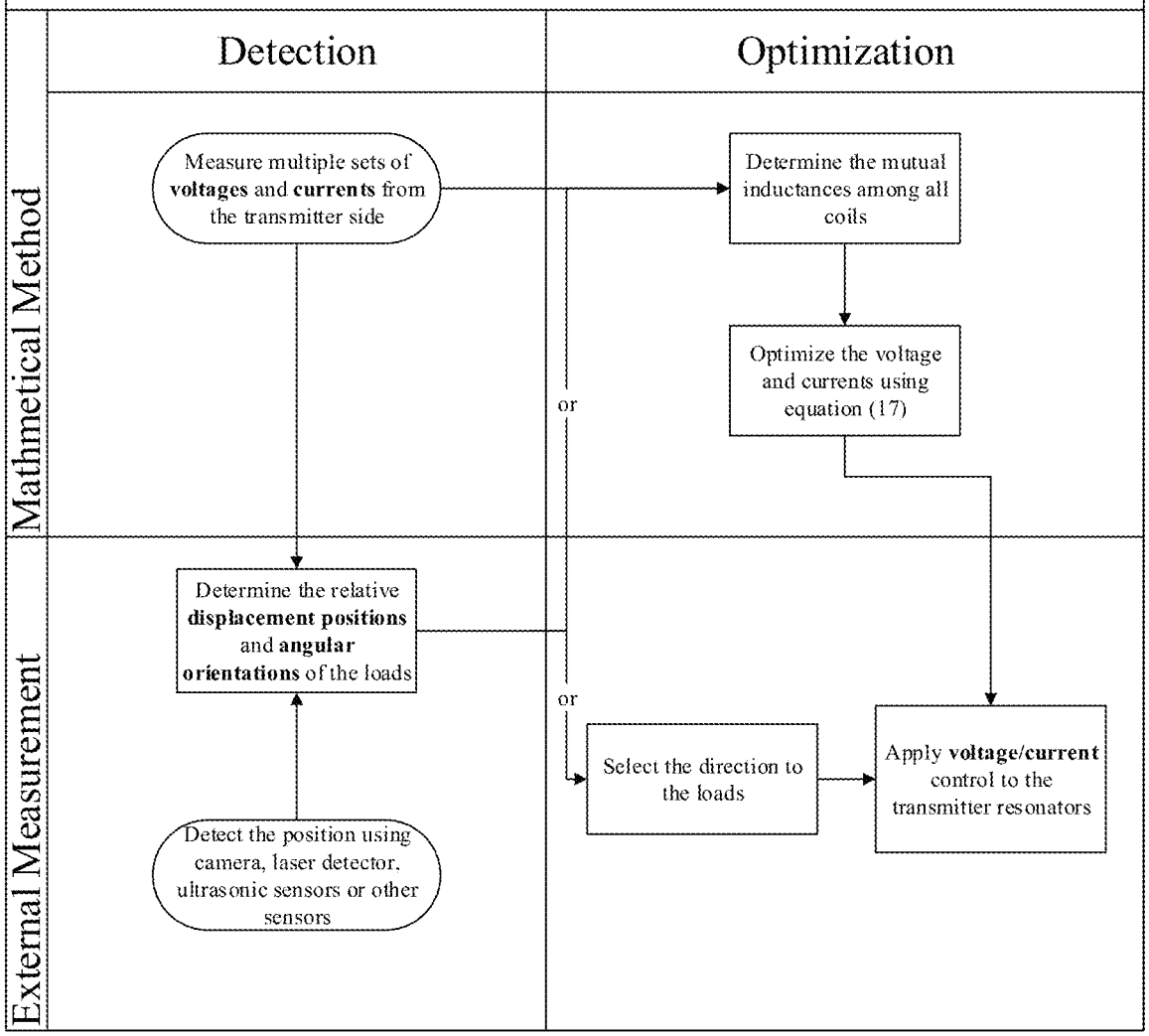
FIG. 14 shows block diagrams of precise load detection and optimization implementations for omni-directional wireless power transfer.

In one embodiment, another approach is proposed to direct the wireless power towards the loads. The second approach is different from the above discrete amplitude modulation approach that does not rely on any exact load position information. In the second approach, the scanning stage is not needed, but the location of the load is needed to be determined. The load locations can be determined (i) by a mathematical method or (ii) by using measurement equipment such as video camera. FIG. 14 shows examples of the block diagrams for implementing the "detecting" and "power delivering" stages. For the mathematical method, the parameters of the system matrix of equation (17) can be determined by the parameter monitoring technique described in U.S. Provisional Patent Application No. 61/862,627 entitled "METHODS FOR PARAMETER IDENTIFICATION, LOAD MONITORING AND OUTPUT POWER CONTROL FOR WIRELESS POWER TRANSFER SYSTEMS" and filed on Aug. 6, 2013. Such information allows the positions of the loads to be determined indirectly by calculating the mutual inductance terms as the unknowns. The mutual inductance terms include the effects of the distances between the transmitter coils and the receiver coil of the load as well as the orientation of the receiver coil of the load. If video camera or laser equipment is used to detect the locations of the loads, the positional information can be used directly for the selective unidirectional power flow paths. This is achieved by focusing the magnetic flux towards the loads.

Figure 15:
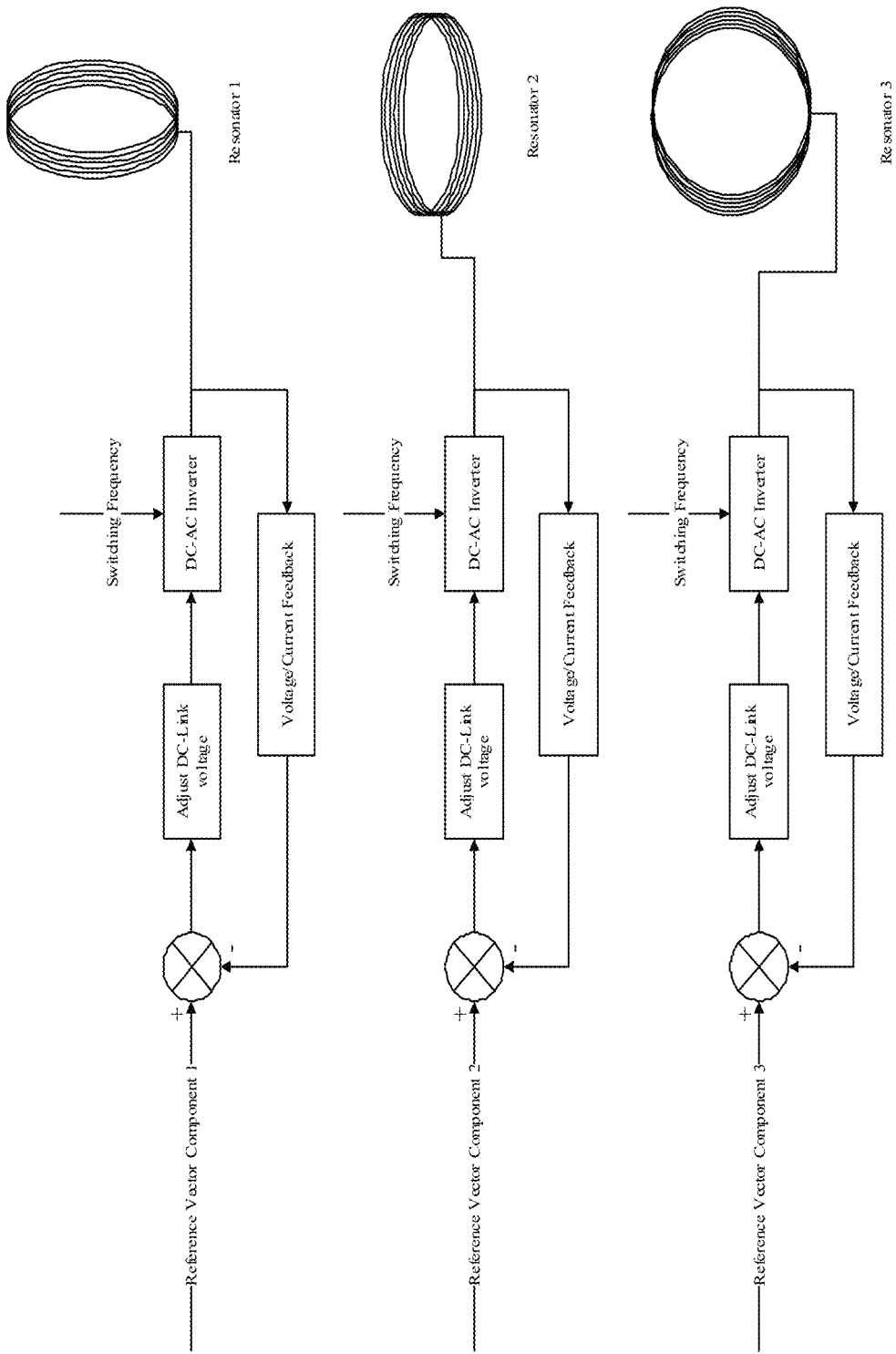
FIG. 15 shows a schematic diagram of an embodiment of dc-link voltage-control of the power inverters that drive the transmitter coils.
Figure 16:
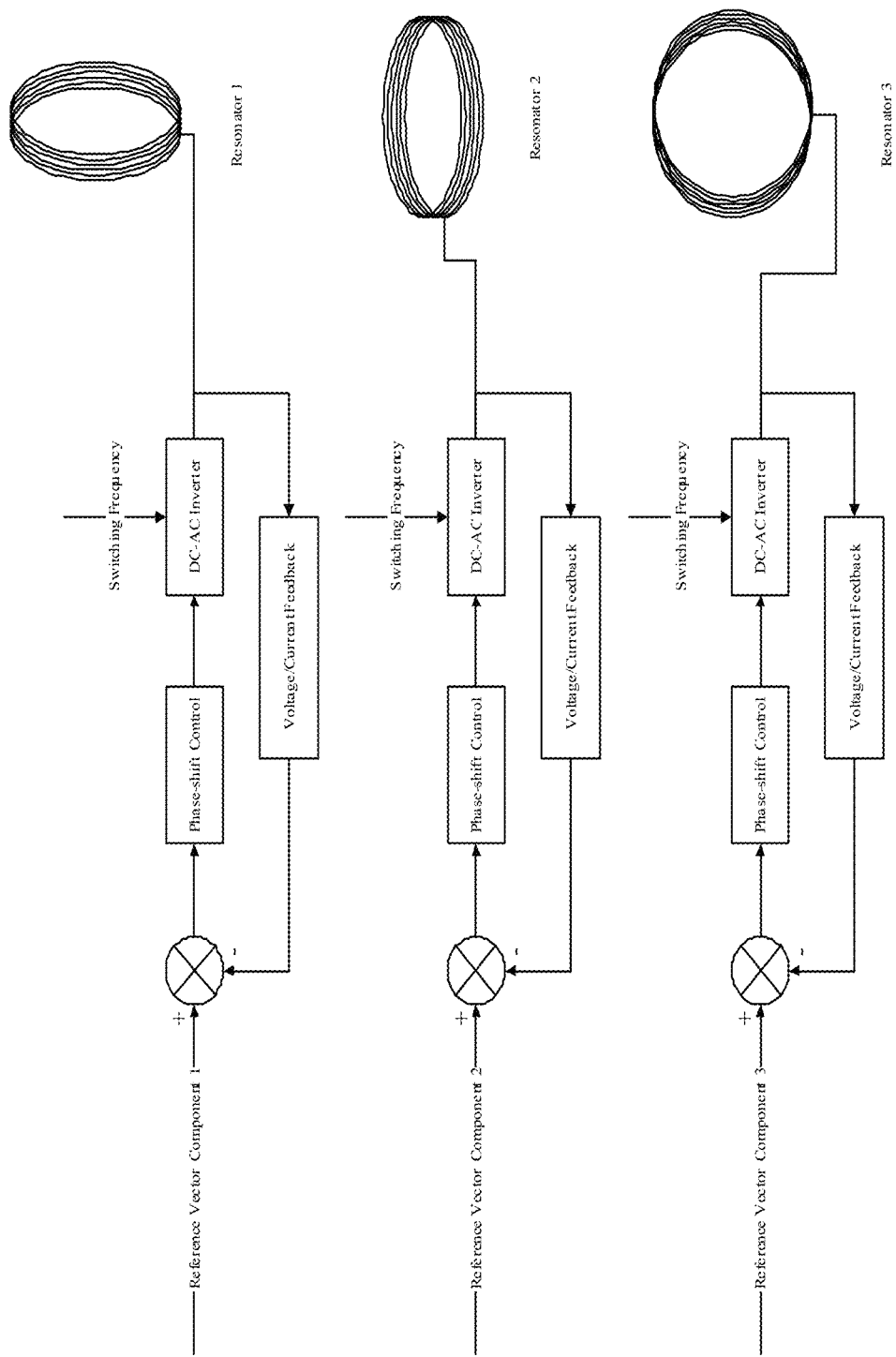
FIG. 16 shows a schematic diagram of an embodiment of phase-shift control of the power inverters that drive the transmitter coils.
Figure 17:
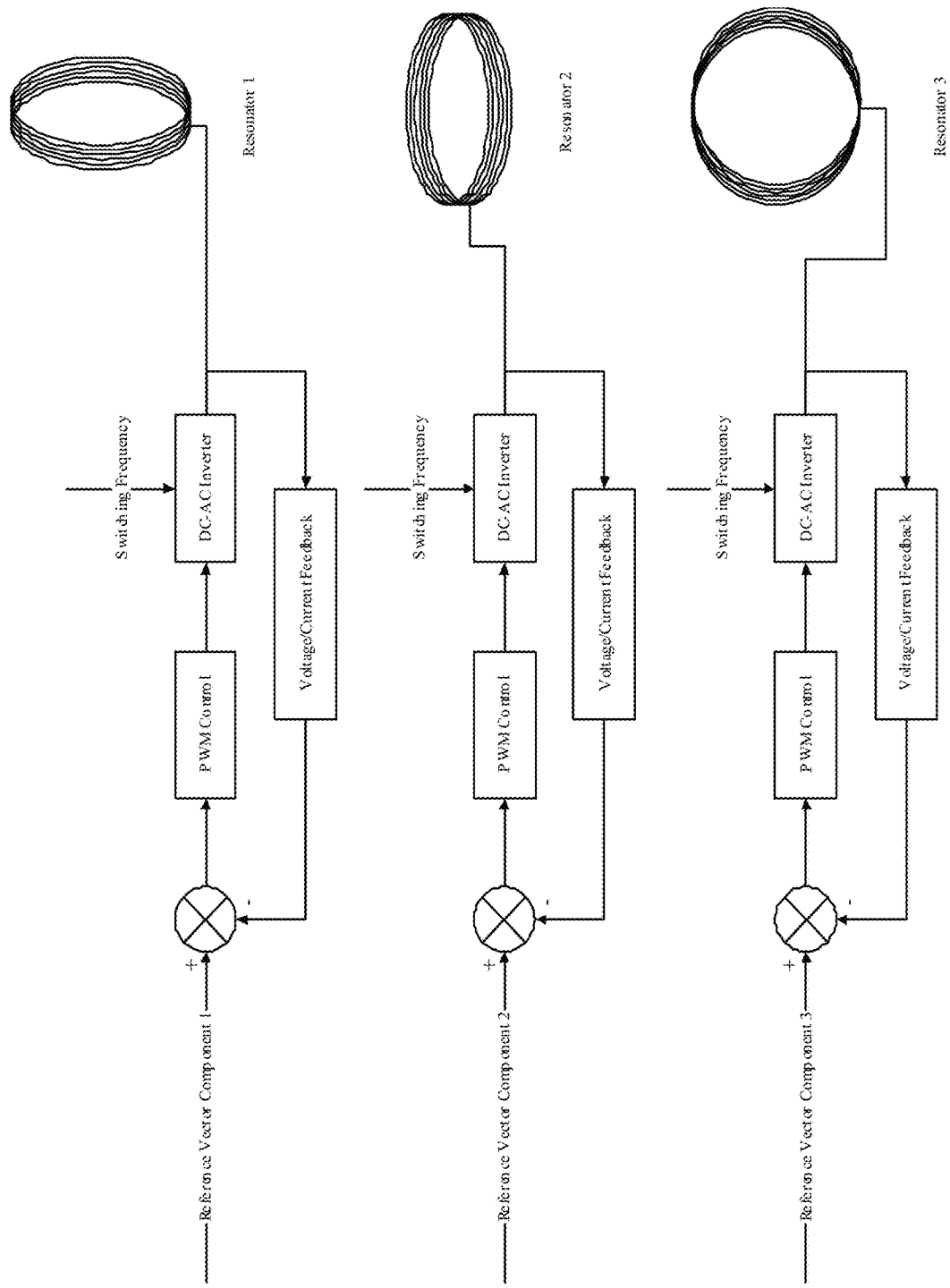
FIG. 17 shows a schematic diagram of an embodiment of current-control of the power inverters that drive the transmitter coils.

In various embodiments, the implementation of the proposed scanning, detecting and power delivering processes can be achieved in different forms. Some examples of implementations include the use of dc-link voltage-control (FIG. 15), phase-shift control (FIG. 16) and current-control (FIG. 17) of the power inverters that drive the transmitter coils. In general, individual control loops (one for each phase) are needed. A 3-phase power inverter or 3 single-phase power inverters can be used, depending on which type of control is chosen. Since each instantaneous magnetic field vector can be determined from the input current and/or voltage information of the three transmitter coils, the three individual current/voltage reference signals can be treated as the input reference vectors for the corresponding control loops for the three transmitter coils as shown in FIG. 15-FIG. 16.

Figure 18:
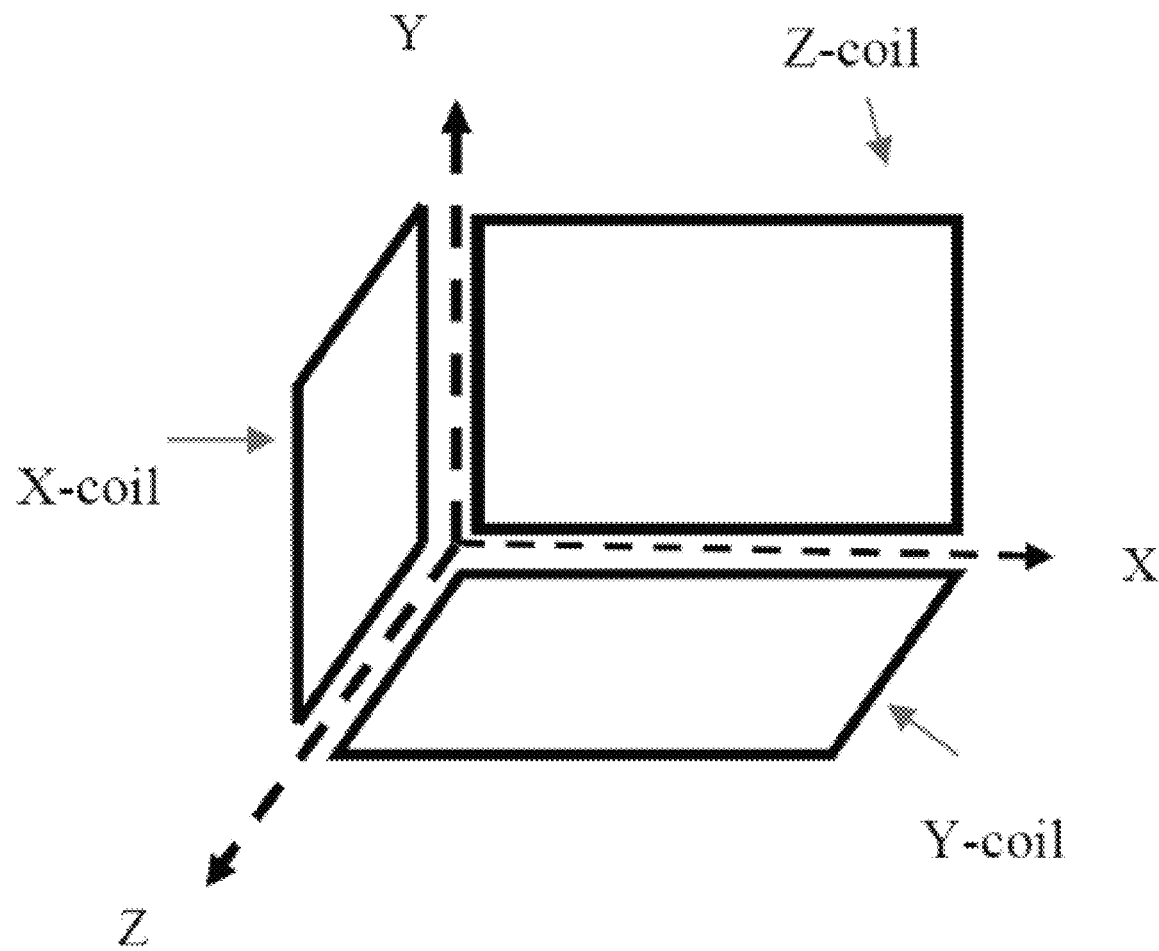
FIG. 18 shows a schematic diagram of an embodiment of the structure of the transmitter coils.
Figure 19:
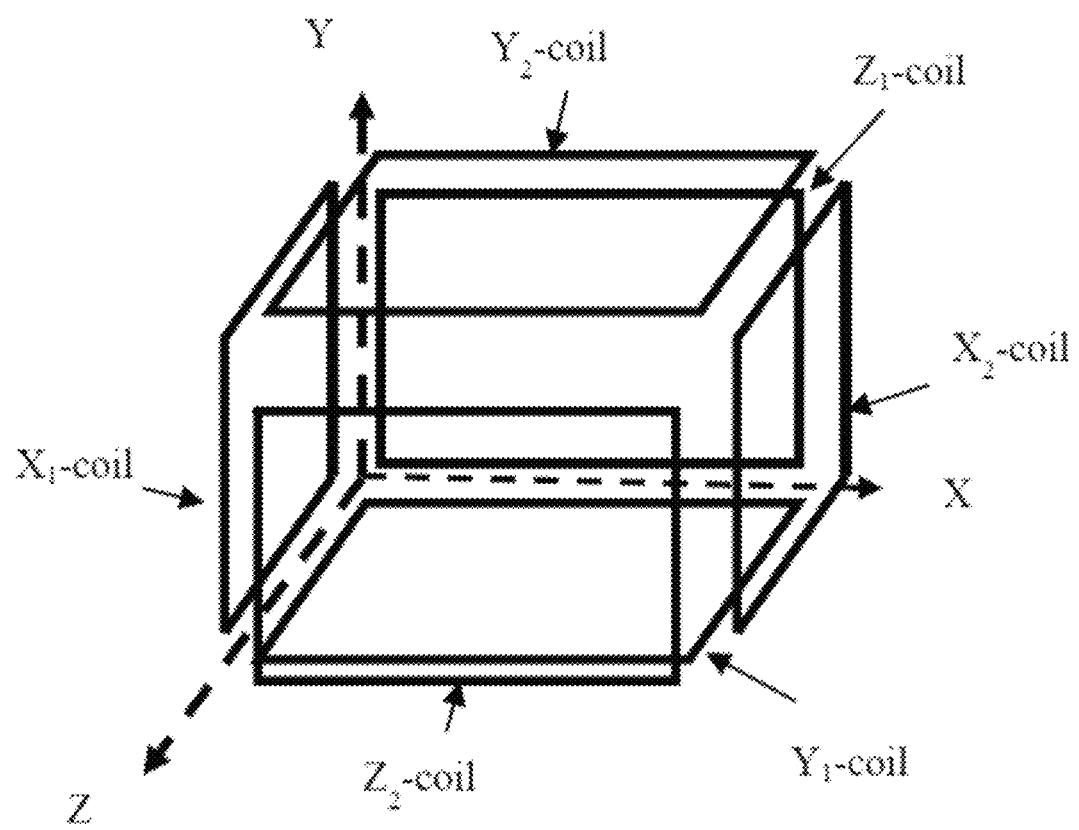
FIG. 19 shows a schematic diagram of another embodiment of the structure of the transmitter coils.

It is important to note that the control space, within which loads can be wirelessly charged, can be outside and/or inside the 3 orthogonal coils. Although the above embodiments of the proposed method have been explained with an example of 3 orthogonal coils sharing the same center, the proposed method can be modified so that 3 orthogonal coils need not share the same origin as their coil centers. For example, the 3 orthogonal coils can be placed on the floor and two adjacent sides of the walls of a room. Such structure will lead to a different shape of its magnetic field surface as shown in FIG. 18. As long as the no-load magnetic field surface shape is known, the distortion of such surface caused by the load power consumption can be used to derive the load positions, so that wireless power can be directed to the distorted regions of the surface. Another alternative of the orthogonal winding structure is shown in FIG. 19, in which the phase winding is split into two portions. That is, the winding for the x-axis is split into $X_1$-coil and $X_2$-coil. These two split coils are connected with a wire. The same split-coil principle applies to phase Y and Phase Z. It is important to stress that the 3-dimensional space enclosed by the planes of the 6 coils forms the volume controlled by the omni-directional wireless power system. The space outside and nearby such enclosed space (enclosed by the 6 coil planes in FIG. 19) can be considered as the control space for the omni-directional wireless power system.

Figure 20:
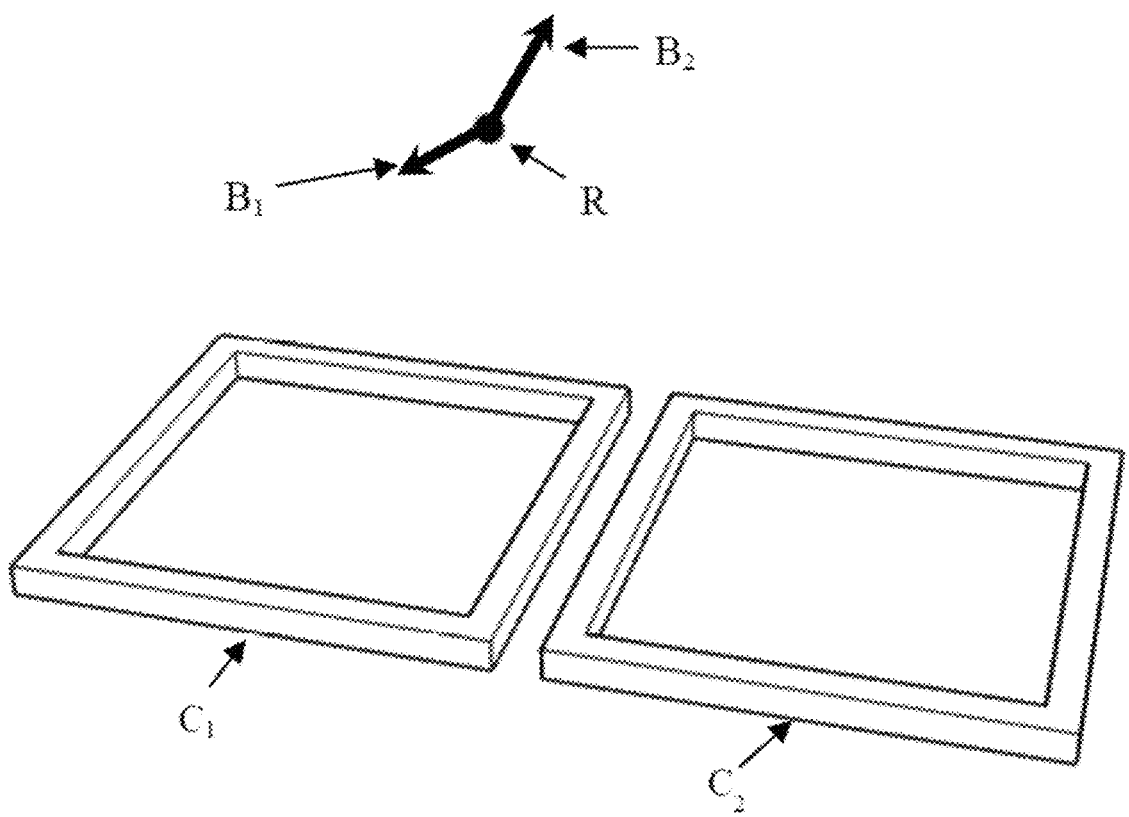
FIG. 20 shows a schematic diagram of another embodiment of the structure of the transmitter coils.
Figure 21:
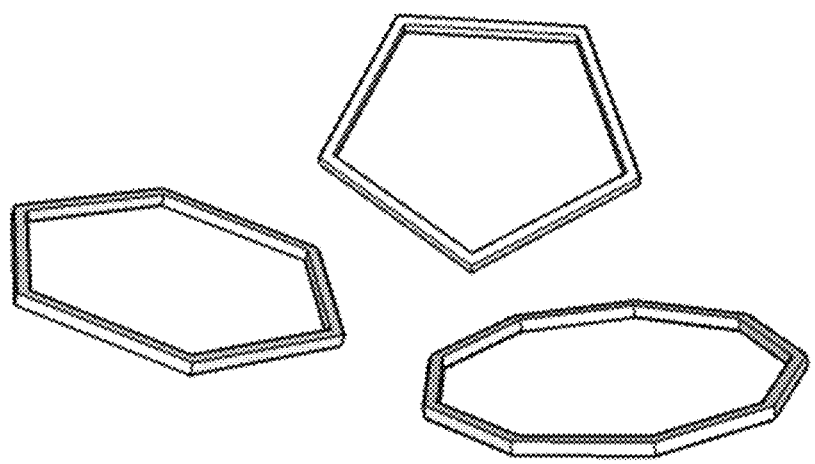
FIG. 21 shows a schematic diagram of another embodiment of the structure of the transmitter coils.

Despite the regular forms of transmitter coils proposed above, multiple irregular transmitter coils can be used to achieve partial or full functionalities of omni-directional wireless power transfer applying the control method described herein. This is because the compulsory requirement of the omni-directional wireless power transfer is the existence of two or more linearly independent magnetic field vectors at the positions of the receiving coils. The system would work regardless of the shapes, dimensions, positions and attitudes (the facing angles) of the transmitter coils. Practically there are restrains on energy efficiency, maximum ratings of electrical devices and safety issues to limit the allocations of the transmitting coils. In the example shown in FIG. 20, C1 and C2 are two square transmitter coils located in the same plane. At receiver position R, the magnetic fields induced by C1 and C2 are vectors B1 and B2 respectively. Since the vectors B1 and B2 are linearly independent, it is able to achieve partially omni-directional wireless power transfer at the point R using the proposed control method of the preset application. In FIG. 21, an example of using three polygonal coils as the transmitter coils for omni-directional wireless power transfer is shown.

The foregoing description of various embodiments of the claimed subject matter has been provided for the purposes of illustration and description. It is not intended to be exhaustive or to limit the claimed subject matter to the precise forms disclosed. The terms and expressions employed herein are used as terms and expressions of description and not of limitation, and there is no intention, in the use of such terms and expressions, of excluding any equivalents of the features shown and described or portions thereof. Embodiments were chosen and described in order to best describe the principles of the invention and its practical application, thereby enabling others skilled in the relevant art to understand the claimed subject matter, the various embodiments and with various modifications that are suited to the particular use contemplated. So, it will be apparent to those of ordinary skill in the art that other embodiments incorporating the concepts disclosed herein may be used without departing from the spirit and scope of the invention. Accordingly, the described embodiments are to be considered in all respects as only illustrative and not restrictive.

What is claimed:

1. A wireless power transfer transmitter, comprising a plurality of coils configured to generate a magnetic field,
    wherein the wireless power transfer transmitter is configured to:
    a) adjust, for each point of N distributed points, voltage amplitudes for the wireless power transfer transmitter to amplitudes of a reference voltage vector corresponding to the respective point for a predetermined period of time, and capture a current amplitude flowing through each coil of the plurality of coils to form magnetic coordinates corresponding to the respective point, wherein the N distributed points are sampled from a surface of a unit space, wherein a shape of the unit space is that of the magnetic field generated by the plurality of coils, and wherein coordinate values of each point of the N distributed points are proportional to the amplitudes of the reference voltage vector corresponding to the respective point;
    b) obtain, for each point of the N distributed points, a distortion distance between the formed coordinates and reference coordinates corresponding to the respective point, wherein the reference coordinates are magnetic coordinates corresponding to the respective point formed under a no-load condition; and
    c) apply the amplitudes of the reference voltage vector corresponding to each respective point for a period of time proportional to its respective distortion distance.

2. The wireless power transfer transmitter according to claim 1, wherein the wireless power transfer transmitter is further configured to: d) filter out points of the N distributed points that have distortion distances less than a predetermined threshold.

3. The wireless power transfer transmitter according to claim 2, wherein the plurality of coils are configured to generate at least two linearly independent magnetic field vectors.

4. The wireless power transfer transmitter according to claim 3, further comprising a machine readable medium in operable communication with the plurality of coils and having software instructions stored thereon that when executed cause the wireless power transfer transmitter to perform a), b), c), and d).

5. The wireless power transfer transmitter according to claim 2, further comprising a machine readable medium in operable communication with the plurality of coils and having software instructions stored thereon that when executed cause the wireless power transfer transmitter to perform a), b), c), and d).

6. The wireless power transfer transmitter according to claim 2, further comprising a machine readable medium in operable communication with the plurality of coils and having software instructions stored thereon that when executed cause the wireless power transfer transmitter to perform a), b), c), and d).

7. The wireless power transfer transmitter according to claim 1, further comprising a machine readable medium in operable communication with the plurality of coils and having software instructions stored thereon that when executed cause the wireless power transfer transmitter to perform a), b), and c).

8. The wireless power transfer transmitter according to claim 7, wherein the plurality of coils are configured to generate at least two linearly independent magnetic field vectors.

9. The wireless power transfer transmitter according to claim 1, wherein the plurality of coils are configured to generate at least two linearly independent magnetic field vectors.

10. A wireless power transfer transmitter, comprising a plurality of coils configured to generate a magnetic field, wherein the wireless power transfer transmitter is configured to:
  a) adjust, for each point of N distributed points, current amplitudes for the wireless power transfer transmitter to amplitudes of a reference current vector corresponding to the respective point for a predetermined period of time, and capture a voltage amplitude in each coil of the plurality of coils to form magnetic coordinates corresponding to the respective point, wherein the N distributed points are sampled from a surface of a unit space, wherein a shape of the unit space is that of the magnetic field generated by the plurality of coils, and wherein coordinate values of each point of the N distributed points are proportional to the amplitudes of the reference current vector corresponding to the respective point;
  b) obtain, for each point of the N distributed points, a distortion distance between the formed coordinates and reference coordinates corresponding to the respective point, wherein the reference coordinates are magnetic coordinates corresponding to the respective point formed under a no-load condition; and
  c) apply the amplitudes of the reference current vector corresponding to each respective point for a period of time proportional to its respective distortion distance.

11. The wireless power transfer transmitter according to claim 10, wherein the wireless power transfer transmitter is further configured to: d) filter out points of the N distributed points that have distortion distances less than a predetermined threshold.

12. The wireless power transfer transmitter according to claim 11, wherein the plurality of coils are configured to generate at least two linearly independent magnetic field vectors.

13. The wireless power transfer transmitter according to claim 12, further comprising a machine readable medium in operable communication with the plurality of coils and having software instructions stored thereon that when executed cause the wireless power transfer transmitter to perform a), b), c), and d).

14. The wireless power transfer transmitter according to claim 10, further comprising a machine readable medium in operable communication with the plurality of coils and having software instructions stored thereon that when executed cause the wireless power transfer transmitter to perform a), b), and c).

15. The wireless power transfer transmitter according to claim 14, wherein the plurality of coils are configured to generate at least two linearly independent magnetic field vectors.

16. The wireless power transfer transmitter according to claim 10, wherein the plurality of coils are configured to generate at least two linearly independent magnetic field vectors.

* * * * *